United States Patent
Szulczewski et al.

(10) Patent No.: US 10,204,352 B2
(45) Date of Patent: Feb. 12, 2019

(54) SYSTEMS AND TECHNIQUES FOR RANKING ITEMS ON A SCROLLABLE FEED USING A HYBRID USER INTERFACE

(71) Applicant: ContextLogic Inc., San Francisco, CA (US)

(72) Inventors: Piotr Szulczewski, San Francisco, CA (US); Danny S. Zhang, San Francisco, CA (US); Tarek Fahmy, San Francisco, CA (US); Jack Z. Xie, San Francisco, CA (US); Yuli Ye, Oakland, CA (US)

(73) Assignee: ContextLogic Inc., San Francisco, CA (US)

( * ) Notice: Subject to any disclaimer, the term of this patent is extended or adjusted under 35 U.S.C. 154(b) by 0 days.

(21) Appl. No.: 15/146,785

(22) Filed: May 4, 2016

(65) Prior Publication Data

US 2016/0328787 A1 Nov. 10, 2016

Related U.S. Application Data

(60) Provisional application No. 62/156,584, filed on May 4, 2015.

(51) Int. Cl.
*G06Q 30/00* (2012.01)
*G06Q 30/02* (2012.01)
(Continued)

(52) U.S. Cl.
CPC ..... *G06Q 30/0203* (2013.01); *G06F 17/3053* (2013.01); *G06F 17/3056* (2013.01);
(Continued)

(58) Field of Classification Search
CPC ............... G06Q 30/00; G06Q 30/0601; G06Q 30/0613; G06Q 30/0623; G06Q 30/0629; G06Q 30/0631
See application file for complete search history.

(56) References Cited

U.S. PATENT DOCUMENTS 6,112,186 A 8/2000 Bergh et al.
6,321,179 B1 11/2001 Glance et al.
(Continued)

FOREIGN PATENT DOCUMENTS

EP 1065616 A2 1/2001
EP 2428926 A2 3/2012
WO WO-0147257 A1 6/2001

OTHER PUBLICATIONS

Oviatt, Sharon, and Philip Cohen. "Perceptual user interfaces: multimodal interfaces that process what comes naturally." Communications of the ACM 43.3 (2000): 45-53. (Year: 2000).*

(Continued)

*Primary Examiner* — Christopher B Seibert
(74) *Attorney, Agent, or Firm* — Goodwin Procter LLP

(57) ABSTRACT

A method for ranking items may include determining a purchaseability score for each item of a specified type based on a number of impressions of the respective item provided to users during a time period, a quantity of the respective item purchased by the users, and a quantity of the respective item added to shopping carts of the users. The method may further include ranking the items based on the purchaseability scores, generating item feed data indicating an ordering of the items based on the rankings, and providing the item feed data to a user device. The user's device may display a scrollable feed of item panels corresponding to the items, with the item panels ordered according to the ordering of the corresponding items.

23 Claims, 18 Drawing Sheets

(51) Int. Cl.
*G06Q 30/06* (2012.01)
*G06F 17/30* (2006.01)
(52) U.S. Cl.
CPC .. *G06F 17/30554* (2013.01); *G06F 17/30864* (2013.01); *G06Q 30/0201* (2013.01); *G06Q 30/0206* (2013.01); *G06Q 30/06* (2013.01); *G06Q 30/0631* (2013.01); *G06Q 30/0643* (2013.01)

(56) References Cited

U.S. PATENT DOCUMENTS

| | | | |
|---|---|---|---|
| 6,487,541 | B1 | 11/2002 | Aggarwal et al. |
| 7,403,910 | B1 | 7/2008 | Hastings et al. |
| 7,870,083 | B2 | 1/2011 | Zhu et al. |
| 8,103,675 | B2 | 1/2012 | Zhou et al. |
| 8,224,698 | B2 | 7/2012 | Libby et al. |
| 8,266,014 | B1 | 9/2012 | Bhosle et al. |
| 8,301,623 | B2 | 10/2012 | Chakrabarti et al. |
| 8,311,885 | B2 | 11/2012 | Kennedy et al. |
| 8,375,035 | B2 | 2/2013 | Carini et al. |
| 8,380,691 | B1 | 2/2013 | Tunguz-Zawislak |
| 8,510,298 | B2 | 8/2013 | Khandelwal |
| 8,566,144 | B2 | 10/2013 | Round et al. |
| 8,572,509 | B2 * | 10/2013 | Gobeil .................. G06F 3/0482 715/834 |
| 8,595,089 | B1 | 11/2013 | Roberts |
| 8,620,767 | B2 | 12/2013 | Linden et al. |
| 8,751,332 | B2 | 6/2014 | Mao |
| 9,104,771 | B2 | 8/2015 | Bank et al. |
| 2001/0021914 | A1 * | 9/2001 | Jacobi .................. G06Q 30/02 705/14.53 |
| 2004/0158497 | A1 | 8/2004 | Brand |
| 2004/0172267 | A1 | 9/2004 | Patel et al. |
| 2006/0041548 | A1 | 2/2006 | Parsons et al. |
| 2008/0103887 | A1 | 5/2008 | Oldham et al. |
| 2008/0256478 | A1 * | 10/2008 | Bromley ............ G05B 19/0423 715/772 |
| 2009/0083126 | A1 | 3/2009 | Koren et al. |
| 2009/0110089 | A1 * | 4/2009 | Green .................. H04L 5/0037 375/260 |
| 2009/0144272 | A1 | 6/2009 | Adarsh et al. |
| 2010/0088265 | A1 | 4/2010 | Pohl |
| 2010/0268661 | A1 * | 10/2010 | Levy ...................... G06Q 30/02 705/347 |
| 2010/0299361 | A1 | 11/2010 | Geney et al. |
| 2011/0066497 | A1 | 3/2011 | Gopinath et al. |
| 2011/0178964 | A1 | 7/2011 | Tseng et al. |
| 2013/0080319 | A1 * | 3/2013 | Greenstone ............ G06Q 20/12 705/39 |
| 2013/0151987 | A1 | 6/2013 | Flynn, III et al. |
| 2013/0254025 | A1 | 9/2013 | Liu et al. |
| 2013/0317891 | A1 | 11/2013 | Grigorash et al. |
| 2014/0172622 | A1 | 6/2014 | Baronshin |
| 2014/0358755 | A1 | 12/2014 | Sekino |
| 2014/0365320 | A1 | 12/2014 | Kanter |
| 2015/0012381 | A1 | 1/2015 | Lazaro |
| 2015/0025996 | A1 | 1/2015 | Fishman et al. |
| 2015/0058174 | A1 * | 2/2015 | Dumon ............ G06F 17/30979 705/26.64 |
| 2015/0088700 | A1 | 3/2015 | Hamilton et al. |
| 2015/0339754 | A1 | 11/2015 | Bloem et al. |
| 2016/0005099 | A1 | 1/2016 | Picconi et al. |
| 2017/0200207 | A1 | 7/2017 | Aswani et al. |
| 2018/0011855 | A1 | 1/2018 | Shuvali et al. |

OTHER PUBLICATIONS

Liu, Sen, Xiaohong Jiang, and Chaolun Xia. "Rss item ranking based on implicit feedback." Fuzzy Systems and Knowledge Discovery (FSKD), 2010 Seventh International Conference on. vol. 6. IEEE, 2010. (Year: 2010).*
U.S. Appl. No. 15/146,806, filed May 4, 2016, Systems and Techniques for Rating Items, Szulczewski, et al.
Schafer, J.B., et al., "E-commerce Recommendation Applications," Data Mining and Knowledge Discovery; 5(1-2):115-153; Jan.-Apr. 2001.
International Search Report and Written Opinion for International PCT/US2016/030839 dated Oct. 4, 2016. (18 pages).
D. Judge, "Is infinite scroll a good thing?" Jun. 23, 2015, available at https://flow.co.uk/is-infinite-scroll-a-good-thing/, last accessed on Nov. 10, 2017 (2 pages).
B. Shaul, "BuzzFeed Launches BuzzFeed News App on iOS," Jun. 22, 2015, available at http://www.adweek.com/digital/buzzfeed-launches-buzzfeed-news-app-on-ios/, last accessed on Nov. 20, 2017 (2 pages).

* cited by examiner

SYSTEMS AND TECHNIQUES FOR RANKING ITEMS ON A SCROLLABLE FEED USING A HYBRID USER INTERFACE

CROSS-REFERENCE TO RELATED APPLICATION

This application claims priority and benefit under 35 U.S.C. § 119(e) of U.S. Provisional Patent Application Ser. No. 62/156,584, titled "Presentation and Recommendation of Products in an Online Marketplace" and filed on May 4, 2015, the content of which is incorporated by reference herein in its entirety.

COPYRIGHT STATEMENT

This disclosure, including the drawings, contains material that is subject to copyright projection. The copyright owner has no objection to the facsimile reproduction by anyone of the patent document or the patent disclosure as it appears in the Patent and Trademark Office patent files or records, but otherwise reserves all copyrights whatsoever.

FIELD OF INVENTION

This disclosure relates generally to systems and techniques for ranking items. Some embodiments relate specifically to ranking items in electronic commerce and, more particularly, to generating user-specific catalogs in an online marketplace for goods and services based, at least in part, on rankings of the goods and services.

BACKGROUND

The widespread availability of computer devices capable of communicating with each other through communication networks (e.g., the Internet) facilitates online shopping and electronic commerce ("e-commerce"). For example, consumers can shop for items (e.g., products and/or services) in online marketplaces. Purchased products can be shipped directly to the consumers. For many consumers, online shopping can be more convenient and more efficient than visiting brick-and-mortar stores in person.

The availability of networked computer devices also facilitates the sharing of ratings and reviews of items by consumers. For example, many online marketplaces permit users to submit ratings and reviews of items, which other users can view when deciding whether to purchase the items.

SUMMARY OF THE INVENTION

Although shopping in an online marketplace can be more convenient that visiting a brick-and-mortar store, many online marketplaces provide an inefficient online shopping experience, thereby making inefficient use of consumers' time and of the resources of computer systems that implement and provide access to the online marketplaces. Such inefficiency can be particularly acute when the consumer is shopping for an item of a particular type, but has not yet decided which item to purchase. The inventors have recognized and appreciated that the efficiency of a user's online shopping experience can be enhanced by presenting items of a specified type to a user in a particular order, based on the items' "purchaseability scores." In this way, the items that the user is most likely to purchase (or to be interested in purchasing) may be presented to the user before (or in lieu of) presenting other items that the user is less likely to purchase. As a result, the user may successfully complete the shopping experience more quickly, thereby saving the user's time and conserving the resources of the computer systems that implement and provide access to the online marketplace.

According to an aspect of the present disclosure, a computer-implemented method is provided, including: receiving, from a device of a user, data indicative of selection of a type of item; for each of a plurality of items of the type, determining a purchaseability score for the respective item based, at least in part, on (1) a number of impressions of the respective item provided to a plurality of users during a time period, (2) a quantity of the respective item purchased by the plurality of users, and (3) a quantity of the respective item added to shopping carts of the plurality of users; determining a ranking of the items included in the plurality of items based, at least in part, on the purchaseability scores of the respective items included in the plurality of items; generating item feed data indicating an ordering of a set of items including the plurality of items, wherein the ordering of the items included in the set of items is determined based, at least in part, on the ranking of the items included in the plurality of items; and providing the item feed data to the device of the user, wherein the device of the user is configured to display a scrollable feed of item panels corresponding to the items included in the set of items, and wherein the item panels in the scrollable feed are ordered according to the ordering of the corresponding items in the item feed data.

In some embodiments, the purchaseability score for the respective item is further based, at least in part, on a purchase price of the item. In some embodiments, the purchaseability score for the respective item is further based, at least in part, on a quantity of the respective item added to wish lists of the plurality of users.

In some embodiments, the purchaseability score for the respective item is based, at least in part, on the expression:

$$W_1 \times \frac{\text{quant\_purchases}}{\text{impressions}} \times \sqrt{\text{price}} + W_2 \times \frac{\text{quant\_cart}}{\text{impressions}} + W_3 \times \frac{\text{quant\_wish\_list}}{\text{impressions}}$$

wherein $W_1$, $W_2$, and $W_3$ are first, second, and third weights, respectively, wherein 'impressions' is the number of impressions of the respective item provided to the plurality of users during the time period, wherein 'quant_purchases' is the quantity of the item purchased by the plurality of users, wherein 'quant_cart' is the quantity of the item added to shopping carts of the plurality of users, wherein 'quant_wish_list' is the quantity of the item added to wish lists of the plurality of users, and wherein 'price' is a purchase price of the item.

In some embodiments, the method further includes selecting users for inclusion in the plurality of users based, at least in part, on one or more similarities between the user and the users. In some embodiments, the plurality of items is a first plurality of items, the method further includes determining a ranking of a second plurality of items based, at least in part, on (1) the one or more similarities between the user and the users, and (2) data indicating whether the users purchased the respective items included in the plurality of items, and the set of items further includes the second plurality of items. In some embodiments, the ordering of the set of items is further determined based, at least in part, on the ranking of the second plurality of items.

In some embodiments, an ordering among the first plurality of items within the set of items matches an ordering among the first plurality of items within the ranking of the first plurality of items, an ordering among the second plurality of items within the set of items matches an ordering among the second plurality of items within the ranking of the second plurality of items, and an ordering within the set of items between items included in the first plurality of items and items included in the second plurality of items is determined probabilistically.

In some embodiments, the method further includes determining the ordering of the set of items, including: (a) probabilistically selecting between the first plurality of items and the second plurality of items, wherein a first probability of selecting the first plurality of items is $P_1$ and a second probability of selecting the second plurality of items is $1-P_1$; (b) from the selected plurality of items, identifying a highest-ranked item that has not yet been assigned a position in the ordering of the set of items, and assigning the identified item to a next position in the ordering of the set of items; and repeating steps (a) and (b) until a specified number of items have been assigned positions in the ordering of the set of items or until all the items in the first and second pluralities of items have been assigned positions in the ordering of the set of items.

In some embodiments, the method further includes changing the first and second probabilities in response to passage of a specified period of time and/or in response to a request to change the ordering of the set of items. In some embodiments, the method further includes changing the rankings of the items included in the plurality of items by performing a weighted random shuffling of the purchaseability scores of the items included in the plurality of items.

According to another aspect of the present disclosure, a system is provided, including one or more computers programmed to perform operations including: receiving, from a device of a user, data indicative of selection of a type of item; for each of a plurality of items of the type, determining a purchaseability score for the respective item based, at least in part, on (1) a number of impressions of the respective item provided to a plurality of users during a time period, (2) a quantity of the respective item purchased by the plurality of users, and (3) a quantity of the respective item added to shopping carts of the plurality of users; determining a ranking of the items included in the plurality of items based, at least in part, on the purchaseability scores of the respective items included in the plurality of items; generating item feed data indicating an ordering of a set of items including the plurality of items, wherein the ordering of the items included in the set of items is determined based, at least in part, on the ranking of the items included in the plurality of items; and providing the item feed data to the device of the user, wherein the device of the user is configured to display a scrollable feed of item panels corresponding to the items included in the set of items, and wherein the item panels in the scrollable feed are ordered according to the ordering of the corresponding items in the item feed data.

In some embodiments, the purchaseability score for the respective item is further based, at least in part, on a purchase price of the item. In some embodiments, the purchaseability score for the respective item is further based, at least in part, on a quantity of the respective item added to wish lists of the plurality of users.

In some embodiments, the purchaseability score for the respective item is based, at least in part, on the expression:

$$W_1 \times \frac{\text{quant\_purchases}}{\text{impressions}} \times \sqrt{\text{price}} +$$

$$W_2 \times \frac{\text{quant\_cart}}{\text{impressions}} + W_3 \times \frac{\text{quant\_wish\_list}}{\text{impressions}}$$

wherein $W_1$, $W_2$, and $W_3$ are first, second, and third weights, respectively, wherein 'impressions' is the number of impressions of the respective item provided to the plurality of users during the time period, wherein 'quant_purchases' is the quantity of the item purchased by the plurality of users, wherein 'quant_cart' is the quantity of the item added to shopping carts of the plurality of users, wherein 'quant_wish_list' is the quantity of the item added to wish lists of the plurality of users, and wherein 'price' is a purchase price of the item.

In some embodiments, the operations further include selecting users for inclusion in the plurality of users based, at least in part, on one or more similarities between the user and the users. In some embodiments, the plurality of items is a first plurality of items, wherein the operations further include determining a ranking of a second plurality of items based, at least in part, on (1) the one or more similarities between the user and the users, and (2) data indicating whether the users purchased the respective items included in the plurality of items, and wherein the set of items further includes the second plurality of items. In some embodiments, the ordering of the set of items is further determined based, at least in part, on the ranking of the second plurality of items.

In some embodiments, an ordering among the first plurality of items within the set of items matches an ordering among the first plurality of items within the ranking of the first plurality of items, an ordering among the second plurality of items within the set of items matches an ordering among the second plurality of items within the ranking of the second plurality of items, and an ordering within the set of items between items included in the first plurality of items and items included in the second plurality of items is determined probabilistically.

In some embodiments, the operations further include determining the ordering of the set of items, including: (a) probabilistically selecting between the first plurality of items and the second plurality of items, wherein a first probability of selecting the first plurality of items is $P_1$ and a second probability of selecting the second plurality of items is $1-P_1$; (b) from the selected plurality of items, identifying a highest-ranked item that has not yet been assigned a position in the ordering of the set of items, and assigning the identified item to a next position in the ordering of the set of items; and repeating steps (a) and (b) until a specified number of items have been assigned positions in the ordering of the set of items or until all the items in the first and second pluralities of items have been assigned positions in the ordering of the set of items.

In some embodiments, the operations further include changing the first and second probabilities in response to passage of a specified period of time and/or in response to a request to change the ordering of the set of items. In some embodiments, the operations further include changing the rankings of the items included in the plurality of items by performing a weighted random shuffling of the purchaseability scores of the items included in the plurality of items.

According to another aspect of the present disclosure, a computer storage medium is provided, the computer storage medium having instructions stored thereon that, when executed by a data processing apparatus, cause the data processing apparatus to perform operations including: receiving, from a device of a user, data indicative of selection of a type of item; for each of a plurality of items of the type, determining a purchaseability score for the respective item based, at least in part, on (1) a number of impressions of the respective item provided to a plurality of users during a time period, (2) a quantity of the respective item purchased by the plurality of users, and (3) a quantity of the respective item added to shopping carts of the plurality of users; determining a ranking of the items included in the plurality of items based, at least in part, on the purchaseability scores of the respective items included in the plurality of items; generating item feed data indicating an ordering of a set of items including the plurality of items, wherein the ordering of the items included in the set of items is determined based, at least in part, on the ranking of the items included in the plurality of items; and providing the item feed data to the device of the user, wherein the device of the user is configured to display a scrollable feed of item panels corresponding to the items included in the set of items, and wherein the item panels in the scrollable feed are ordered according to the ordering of the corresponding items in the item feed data.

Other aspects and advantages of some embodiments of the invention will become apparent from the following drawings and detailed description, which illustrate the principles of the invention, by way of example only.

The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
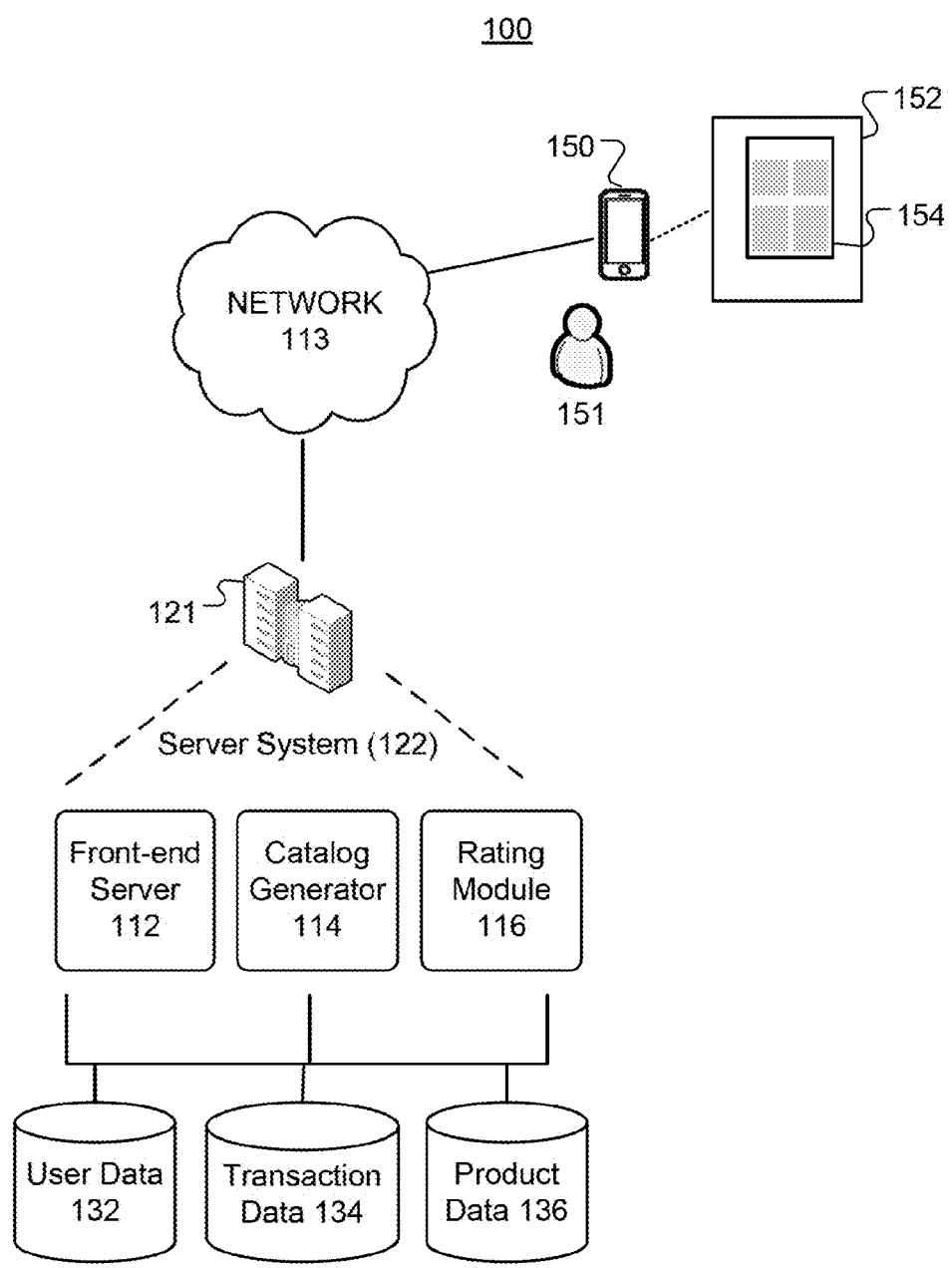
FIG. 1 shows a computer system, according to some embodiments.

FIG. 1 illustrates an example computer system 100 suitable for implementing and providing access to an online marketplace. A server system 122 provides functionality for implementing an online marketplace. The server system 122 comprises software components and databases that can be deployed at one or more data centers 121 in one or more geographic locations, for example. The server system 122 software components comprise a front-end server 112, a catalog generator 114, and a rating module 116. The server system 122 can also include one or more software components for inventory management and load balancing. The software components can comprise subcomponents that can execute on the same or on different individual data processing apparatus. The server system 122 databases comprise a user data database 132, transaction data database 134, and product data database 136. The databases can reside in one or more physical storage systems. The software components and databases will be described further below.

The front-end server 112 provides catalog content to users of the online marketplace, facilitates transactions by the users, and manages user access to the online marketplace. The catalog generator 114 generates catalog content (or "a feed") for users of the online marketplace. The rating module 116 generates rating data for items (e.g., products and/or services) in the online marketplace. The front-end server 112, the catalog generator 114, and the rating module 116 will be further described below.

Users of the online marketplace (e.g., user 151) use client devices (e.g., client device 150) to access the online marketplace implemented by the server system 122 through one or more data communication networks 113 such as the Internet, for example. A client device is a data processing apparatus (e.g., a smart phone, a tablet computer, a smart watch, a personal computer, a game console, or an in-car media system). Other examples of client devices are possible. The user can access the online marketplace from a user interface 154 of a client application 152 running on the client device 150. The client application 152 can be a web browser or a special-purpose software application (e.g., a "mobile app"), for example. The user interface 154 is a graphical user interface that allows a user to interact with one or more catalogs of the online store, make purchases, create wish lists, and/or log on to the online store, for example. The user interface 154 will be further described below.

By way of illustration, when the user uses the client application 152 to access the online marketplace, the client application 152 retrieves, from the front-end server 112, catalog content specific for the user, and presents the catalog content in the user interface 154. The catalog content can be created by the catalog generator 114 and provided to the front-end server 112. Creating catalog content will be further described below.

When the user selects an item (e.g., product or service) to purchase from one or more catalogs presented in the user interface 154, the client application 152 presents in the user interface 154 a "shopping cart" or list that contains the selected products and/or services. Meanwhile, the client application 152 can send the front-end server 112 a request for creating or updating a copy of the user's shopping cart which is stored in transaction data database 134.

When the user makes a purchase (e.g., initiates a checkout for an item in the user's shopping cart presented by the client device 152), the client device 152 sends the front-end server 112 a request for completing the purchase. The front-end server 112 completes the purchase and stores a transaction record for the purchase in the transaction data database 134.

The user can also select a product or service in one or more catalogs presented by the client application 152 to add the item to a "wish list" to which the user can return later for future viewing or purchasing. In response to the user's selection, the client application 152 presents in the user interface 152 a wish list that contains the selected product and/or service along with any previously added products and services. The client application 152 sends the front-end server 112 a request for creating or updating a copy of the user's wish list which is stored in the transaction data database 134.

Hybrid User Interface

Figure 2:
FIG. 2 shows a user interface for accessing an online marketplace, according to some embodiments.

FIG. 2 illustrates an example user interface 201 of the client application 152 for accessing the online marketplace implemented by the server system 122. The user interface 201 presents a product catalog (or "feed") for the online marketplace. In some implementations, the user interface 201 comprises a category panel 210, collection panel 220, and an item panel (e.g., a product panel) 230. The category panel 210 presents one or more selectable icons corresponding to respective item categories in the online marketplace. Example categories include fashion, watchers, shores, shorts, shirt, jeans, sunglasses, jackets, polo, belt, pants, gadgets, hoodies, suits, rings, wallets and bags, services, and gadgets. Other categories are possible. The category panel 210 can be scrolled horizontally (toward left or right) to display available icons (categories). A user can select a category icon, causing the client application 152 to present another user interface displaying a list of individual products (a product feed) of the corresponding category.

The collection panel 220 presents one or more collections of items ("item collections", e.g., product collections or service collections). A product collection is a list of similar products. Each selectable frame (e.g., 221) displays sample product images of a corresponding collection. The collection panel 220 can be scrolled horizontally to display available collections. A user can select a collection frame, causing the client application 152 to present another user interface displaying a list of individual products (a product feed) of the collection.

The product panel 230 presents a list or feed of individual products. Each selectable frame (e.g., 231) displays a sample image of a corresponding product. The product panel 230 can be scrolled vertically (up or down) to display available products. The product panel 230 can expand upwards and overlay the collection panel 220 and category panel 210. A user can select a product frame, causing the client application 152 to present another user interface (a detail product page) displaying further information of the corresponding product.

The collections and product feeds described above are created for a particular user (i.e., user-specific) by the catalog generator 114 of the server system 122. The client application 152 can record the user's viewing history and send the viewing history to the front-end server 112, which can in turn store the viewing history in the user data database 132. The catalog generator 114 can access the viewing history of the user and create catalog content including layout of the user interface 201 for the user based on the user's viewing history, and provide the catalog content to the client device 152 (e.g., via the front-end server 112). For instance, if the user has viewed more often products or collections related to a particular category, the particular category can be placed ahead of other categories in the category panel 210. Collections related to the particular category can also be placed ahead of other collections in the collection panel 220. Products related to the particular category can also be placed ahead of products related to other categories in the product panel 230. In various implementations, the order of the collection or product placements in the collection panel 220 and product panel 230 can be rearranged (shuffled) such that the user can discover "new" products. For instance, for the first 10 products listed in the product panel 230, the catalog generator 114 can create a layout that includes 4 products from a category most viewed by the user, 2 products from a category viewed next most by the user, 2 products from a category viewed next most by the user, and 2 products from one or more other categories (e.g., randomly chosen categories). The viewing history can be collected over a relatively short moving time window (e.g., past two weeks). In this way, content of a product feed can reflect more recent activities of the user in the online marketplace. Creation of product feeds will be further described later.

Add to Cart Offers

To encourage a user to make a purchase through the online marketplace implemented by the server system 122, product feeds created by the catalog generator 114 and presented by the client application 152 can include various incentives or offers for the user.

Figure 3A:
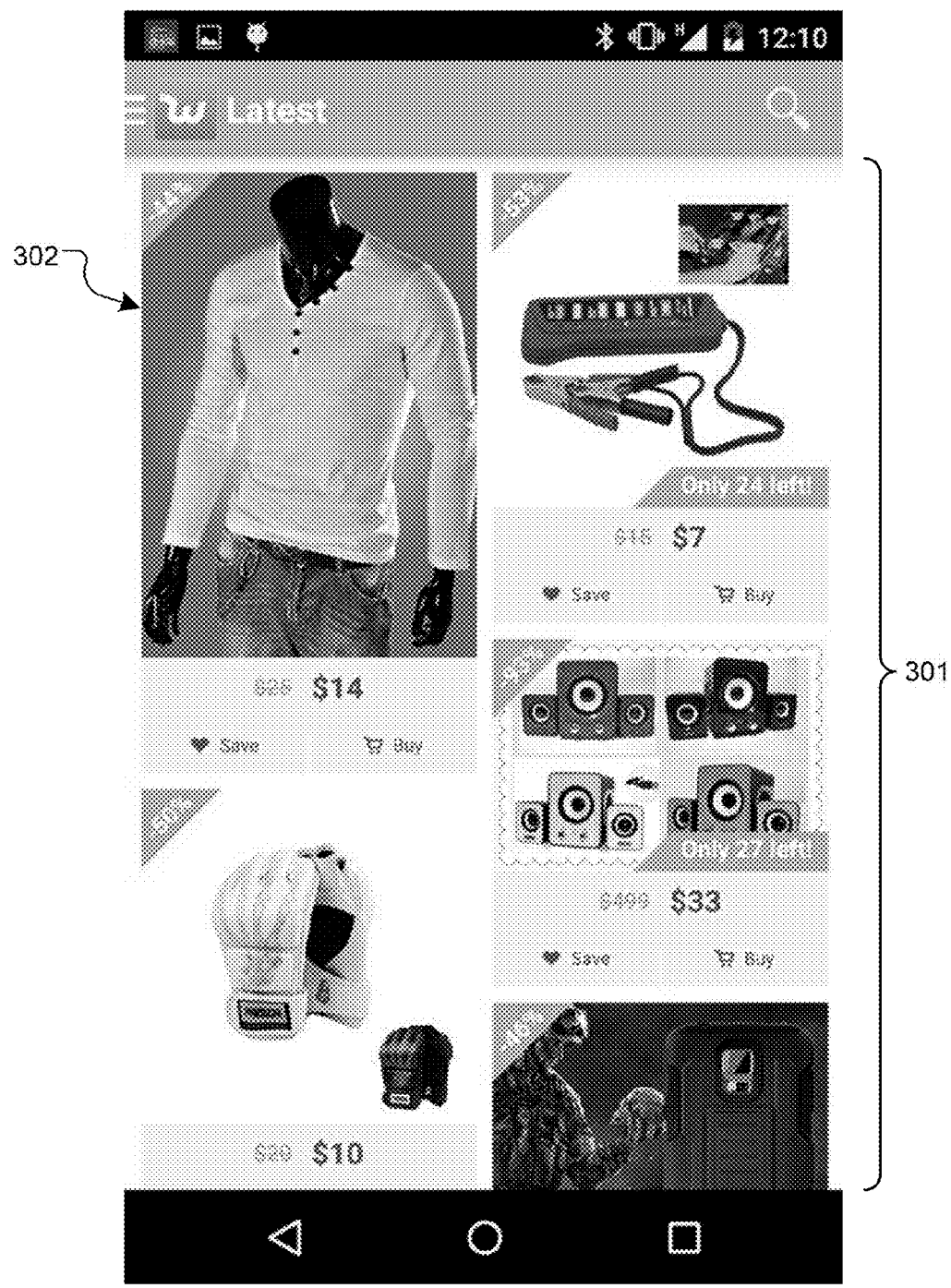
FIGS. 3A, 3B, and 3C show first, second, and third user interfaces, respectively, for encouraging a user to place an item into a virtual shopping cart, according to some embodiments.
Figure 3B:
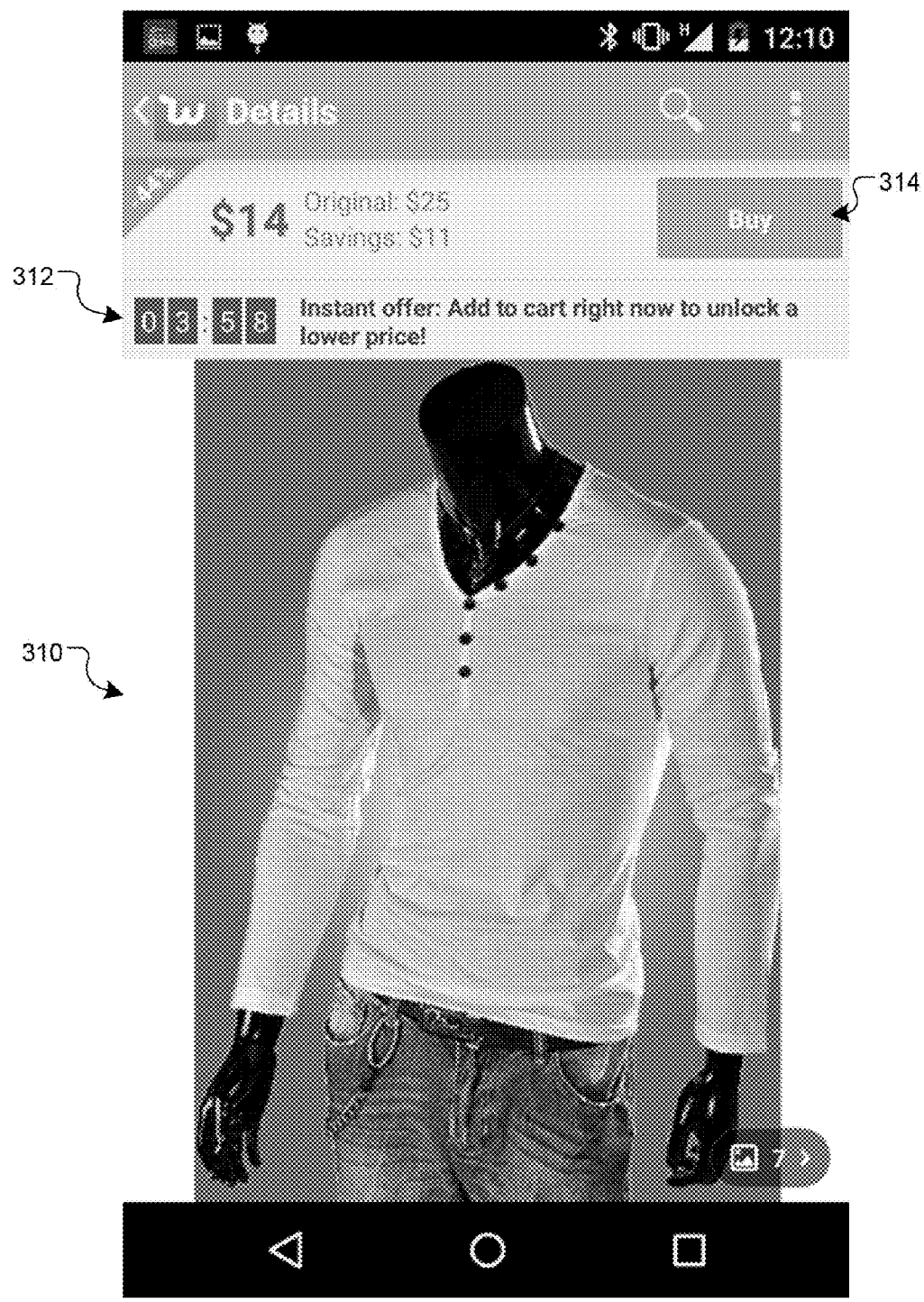
Figure 3C:
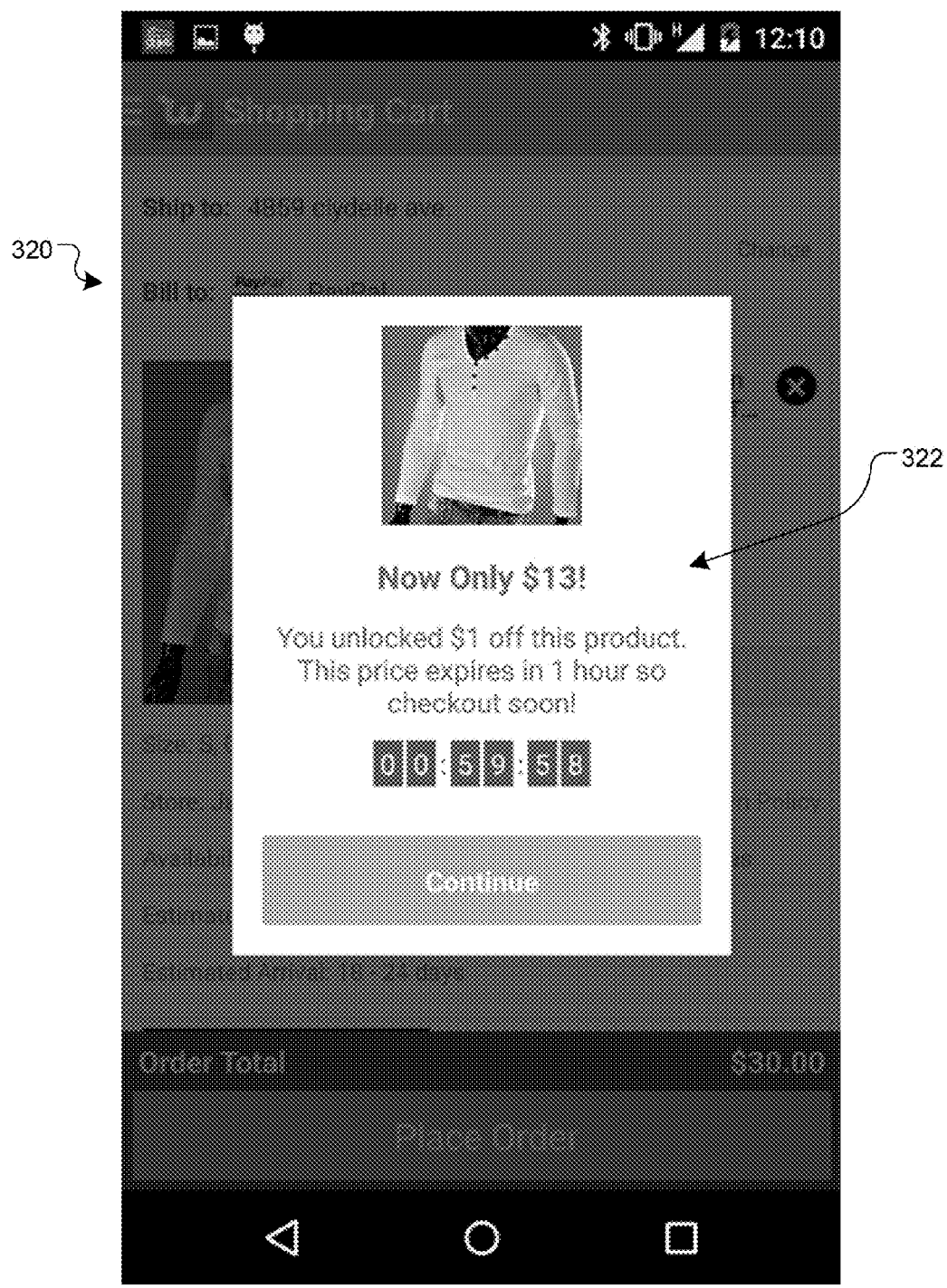

FIGS. 3A-3C illustrate user interfaces for encouraging a user to place a viewed product into a shopping cart. In some embodiments, the user interfaces illustrated in FIGS. 3A-3C may be presented to the user as part of method for encouraging the user to place a viewed product in a shopping cart. In FIG. 3A, a user can select a particular item (e.g., product) 302 in an item feed (e.g., product feed) 301. In response to the user's selection, the client application 152 presents an item detail page (e.g., product detail page) 310, as illustrated in FIG. 3B. The product detail page 310 includes an offer 312 for the user. The offer 312 encourages the user to place the particular product in a shopping cart to obtain ("unlock") a discount to the listed price ($14) of the particular product. The actual discount is unknown to the user before the user places the particular product in the shopping cart. The offer 312 also includes a timer ("03:58") indicating time left before the offer expires, encouraging the user to place the particular product in the shopping cart soon. After the user selects a "Buy" icon 314, the client application 152 presents a shopping cart page 320, including an overlaying frame 322, as illustrated in FIG. 3C. The overlaying frame 322 indicates the discounted price ($13). The overlaying frame 322 also includes a timer ("00:59:58") indicating time left before the offer expires, encouraging the user to purchase the particular product by completing a checkout of the particular product from the shopping cart.

In the product feed 301, a subset of products can be selected (e.g., by the catalog generator 114) to provide offers encouraging the user to place the products in the shopping cart. More particularly, the subset of products can be selected randomly. The amount of discount for each offering can also be determined randomly. In this way, each user could see different products offering different discounts encouraging the each user to place products in the shopping cart. In addition, if the offering of a particular product to a particular user expires, the offering on the same particular product can be made unavailable to that user for a specified period of time (e.g., one week).

Checkout Offer

Figure 4A:
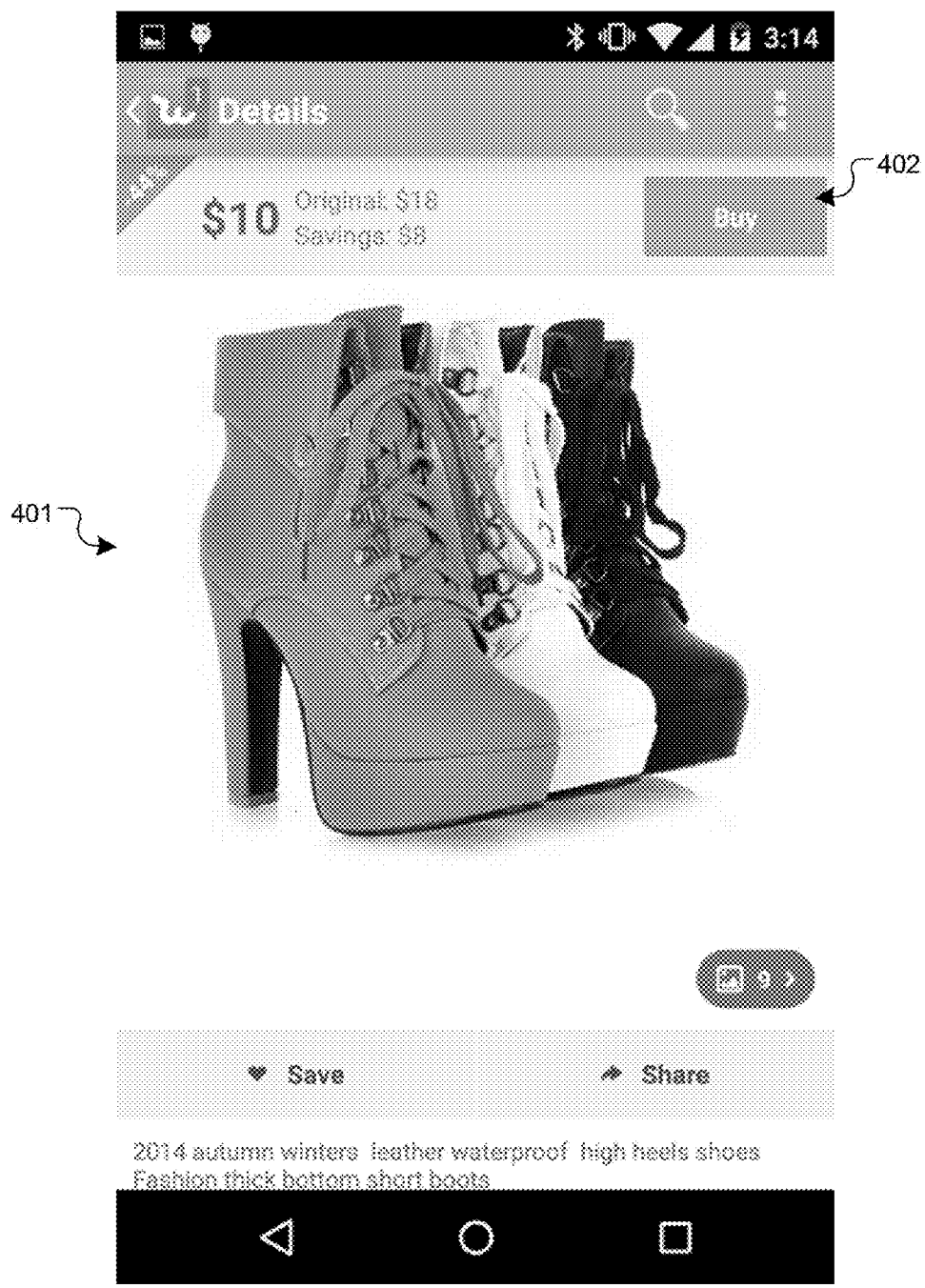
FIGS. 4A and 4B show first and second user interfaces, respectively, for encouraging a user to initiate a checkout process in an online marketplace, according to some embodiments.
Figure 4B:
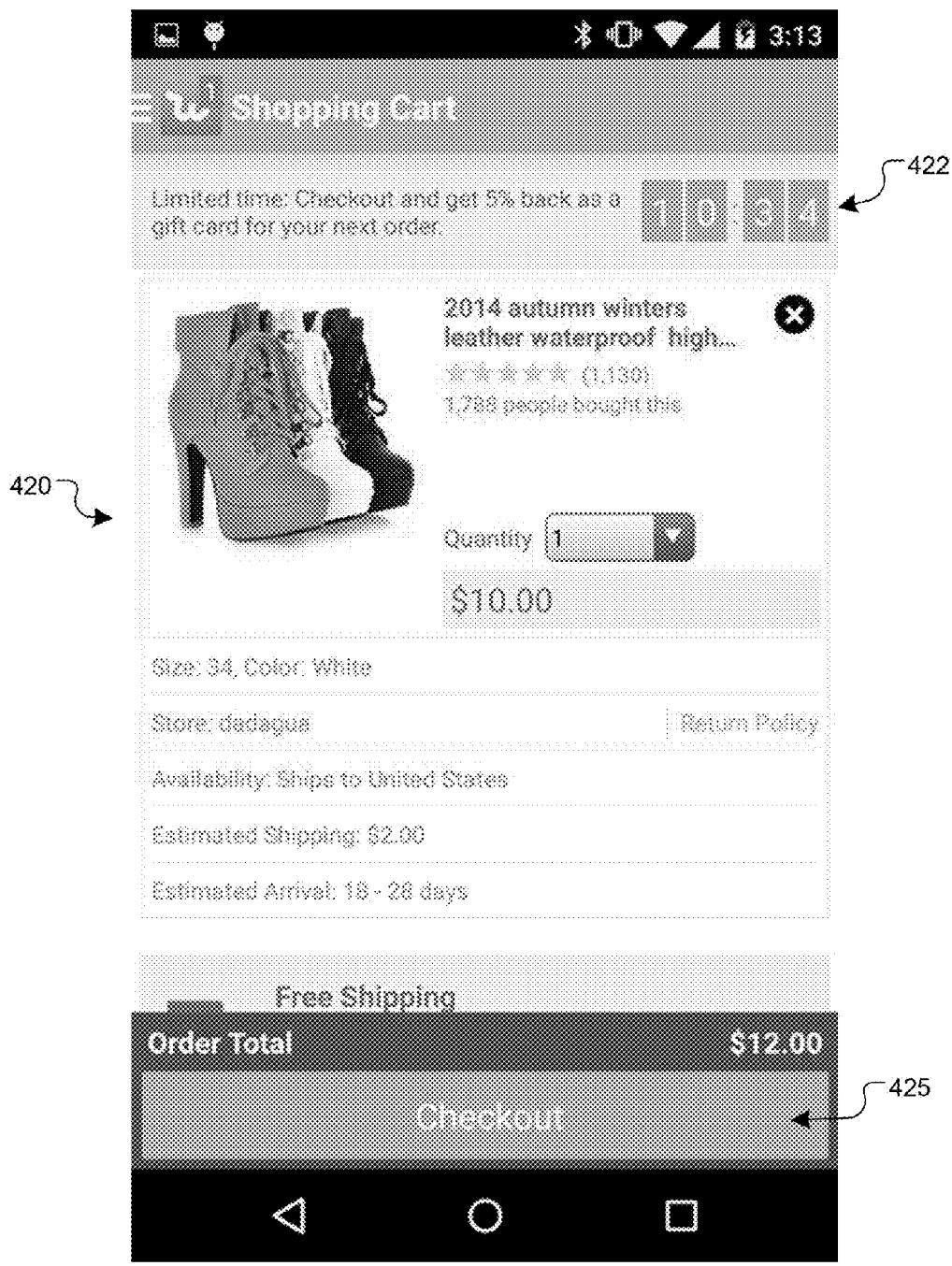

FIGS. 4A and 4B illustrate user interfaces for encouraging a user to initiate a checkout of a product in a shopping cart. In some embodiments, the user interfaces illustrated in FIGS. 4A and 4B may be presented to the user as part of method for encouraging the user to initiate a checkout of a product in a shopping cart. FIG. 4A illustrates an example product detail page 401. In response to a user's selection of a "Buy" icon 402 in the product detail page 401, the client application 152 presents a shopping cart page 420, as illustrated in FIG. 4B. The shopping cart page includes an offer 422 ("5% back as a gift card for your next order") that encourages the user to check out the product (from the shopping cart) within a specified time period, as indicated by a timer ("10:34"). The user can complete the purchase by selecting a "Checkout" icon 425 in the shopping cart page 420. The offer can be provided to the user automatically. For instance, after receiving from the client application 152 a message indicating initiation of the purchase by the user, the front-end server 152 can complete the purchase and place the purchase information in the transaction data database 134. The front-end server 152 can also store in the transaction data database 134 a record of a credit (5% of $12.00=$0.60) that can be used by the user at a later time.

The offer for encouraging a user to check out a product in the user's shopping cart can be provided to users that have not checked out (made purchases) for a specified period of time (e.g., past two weeks). The offer can be provided to such users randomly, so a user cannot expect when the offer will be available. If the offer is shown to a particular user and expires before the particular user makes a purchase, the offer can be made unavailable to the particular user for a specified period of time (e.g., three days).

Hourly Deal

Figure 5:
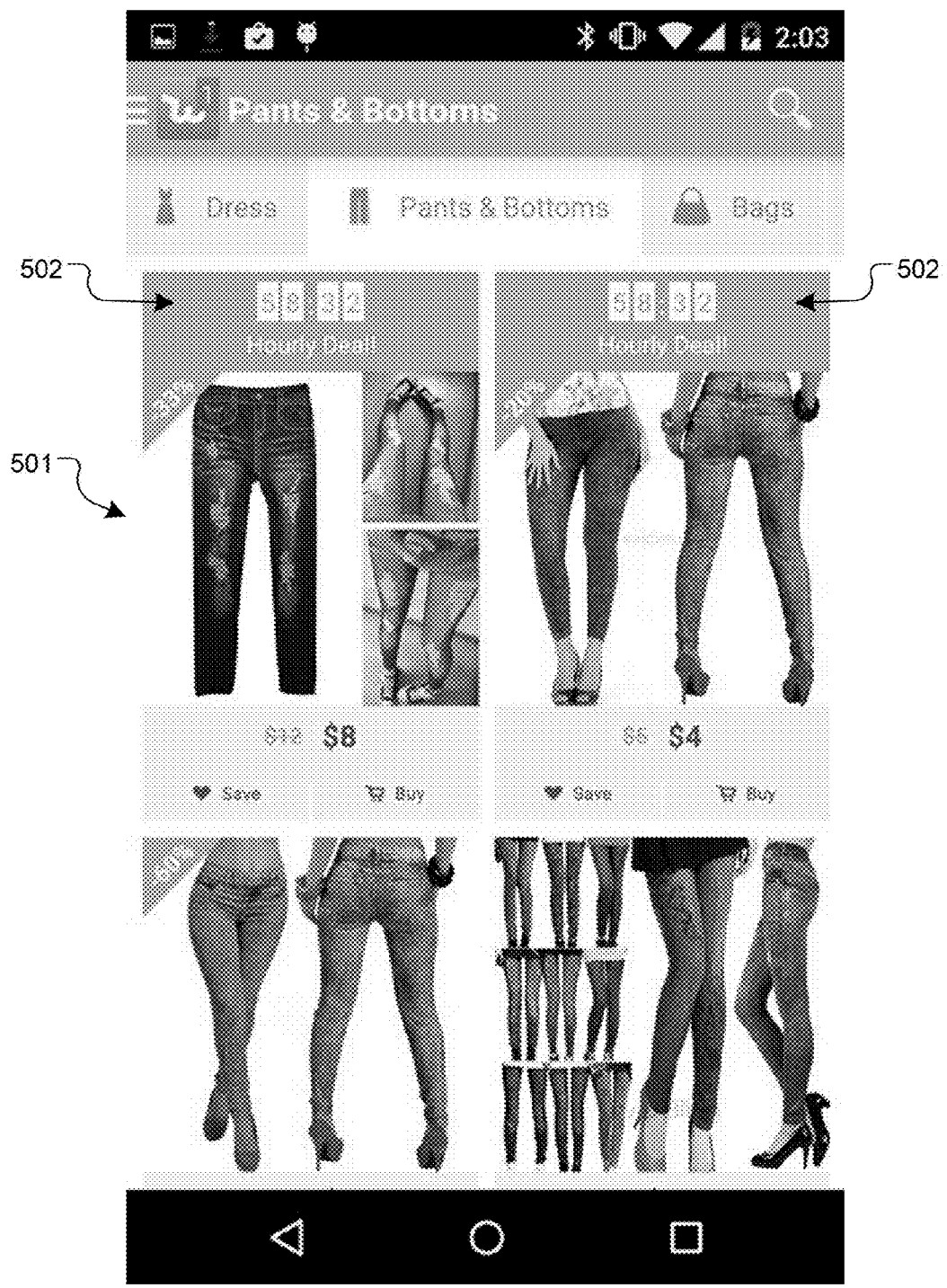
FIG. 5 shows a user interface for viewing an item feed, according to some embodiments.

FIG. 5 illustrates an example item feed page (e.g., product feed page) 501 with limited time offers. In FIG. 5, one or more products 502 from the product feed of the product feed page 501 have limited time offers ("Hourly Deals"). Each discounted product 502 has a timer (e.g., "58:32") indicating the time remaining before the offer expires. The discounted products 502 can be placed at the top of the product feed, and remain on top of the product feed after a refresh of the product feed page 501 (before the timer expires).

The discounted products 502 can be selected (e.g., by the catalog generator 114) randomly from the product feed. When a particular product is selected for this offer, the particular product can be made unavailable for selection for this offer for a specified period of time (e.g., five days).

Save to See Price

Figure 6A:
FIGS. 6A, 6B, and 6C show first, second, and third user interfaces, respectively, for encouraging a user to save an item to a virtual wish list, according to some embodiments.
Figure 6B:
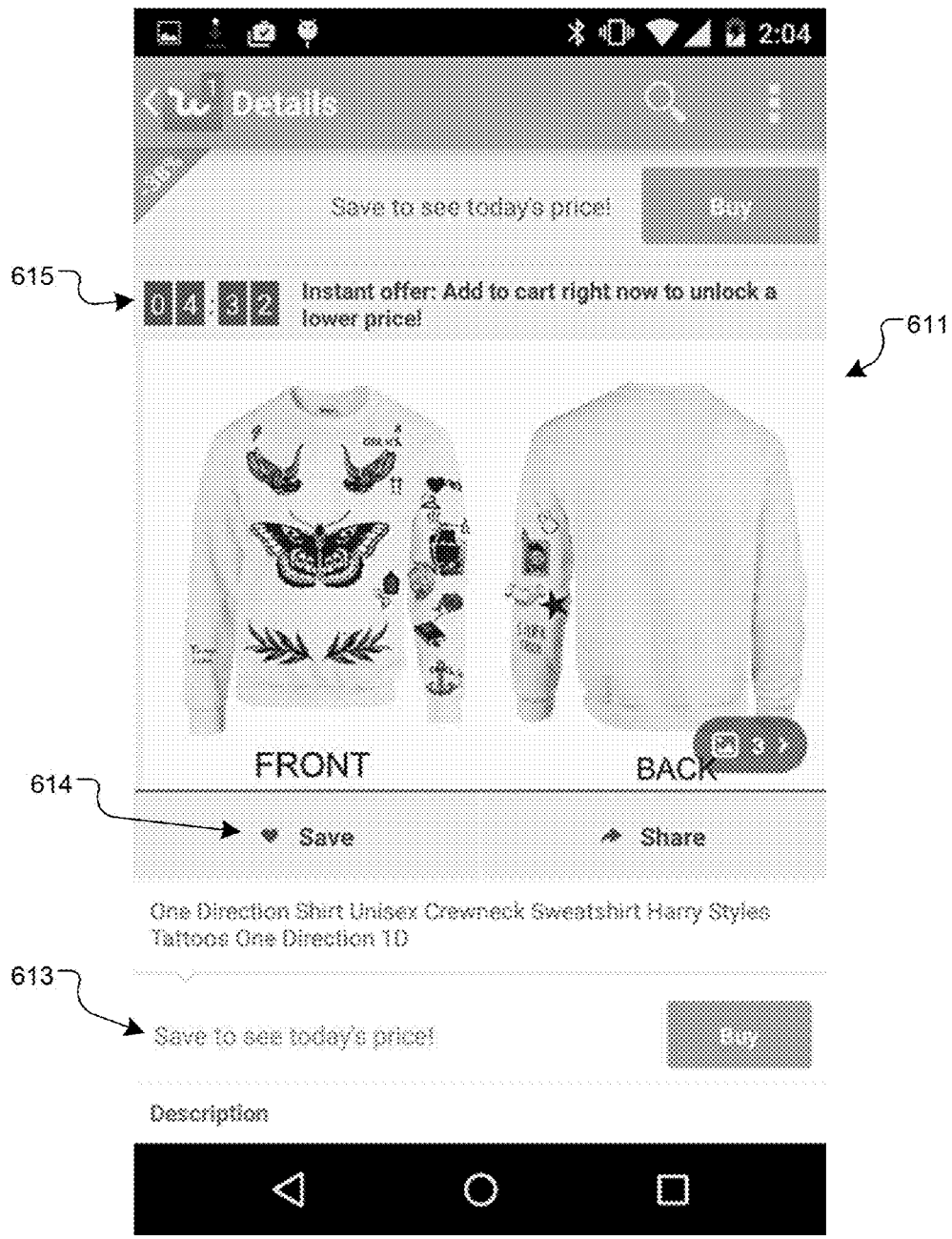
Figure 6C:
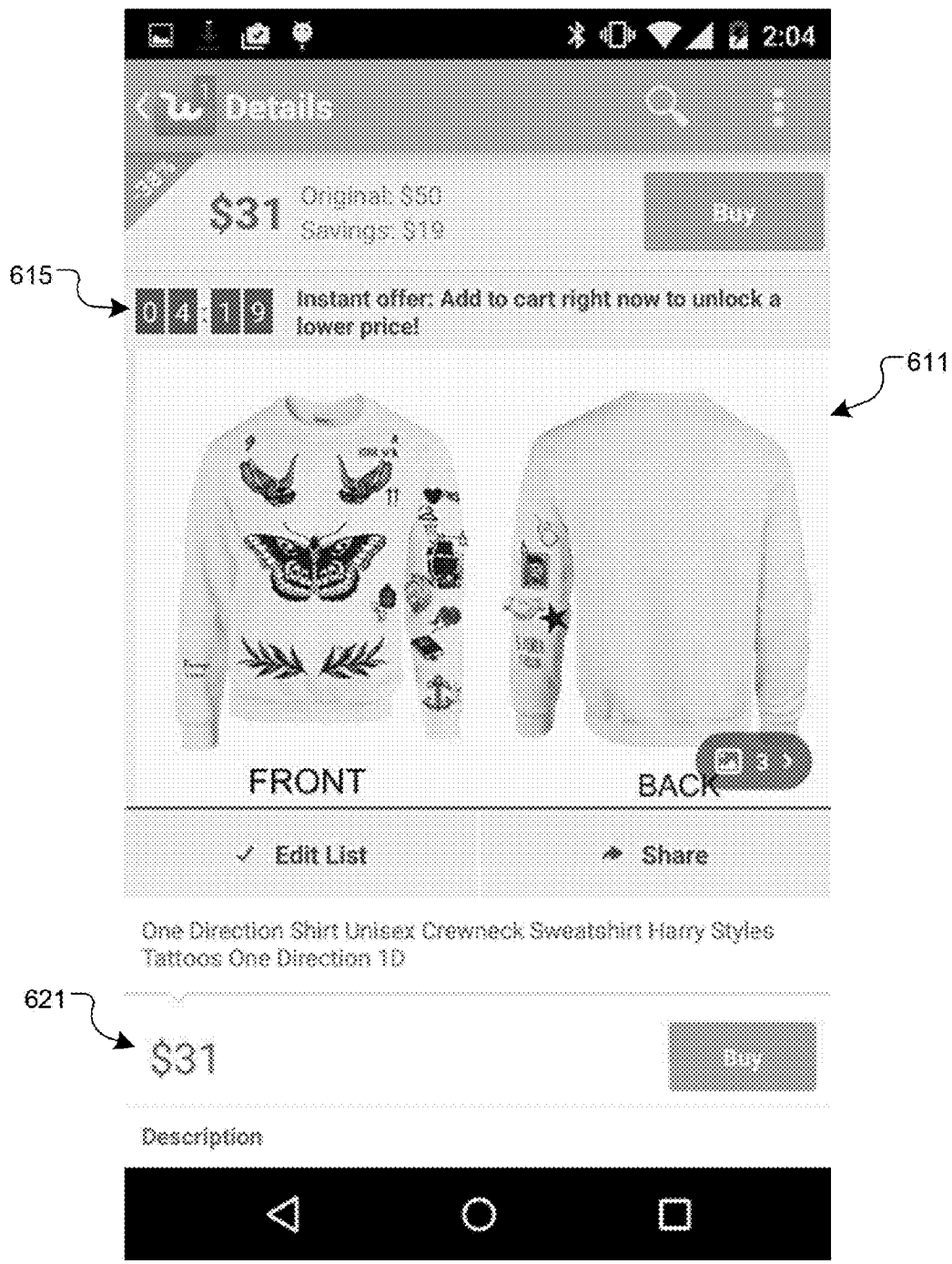

FIGS. 6A-6C illustrate user interfaces for encouraging a user to save a product to a wish list. In some embodiments, the user interfaces illustrated in FIGS. 6A-6C may be presented to the user as part of method for encouraging the user to save a product to a wish list. FIG. 6A illustrates an item feed page (e.g., a product feed page) 601. In the product feed page 601, a discount (−38%) is shown for a product 602 but the price for the product 602 is not shown. Instead, a message "Save to see today's price!" encourages the user the save the product 602 to a wish list. Note that even after the user selects the product 602 in the product feed page 601, without selecting the "Save" icon 605 (to save the product 602 to a wish list), the detail item page (e.g., detail product page) 611 still does not show the price for the product 602, as illustrated in FIG. 6B. Instead, the detail product page 611 shows a message ("Save to see today's price!") that encourages the user the save the product 602 to a wish list. In the example of FIG. 6B, the detail product page 611 also include a timer 615 ("04:32") that indicates time remaining for the offer, and encourages the user to add the product 612 to the shopping cart.

If the user selects the save icon 605 in the product feed page 601 illustrated in FIG. 6A, or selects the save icon 614 in the detail product page 611 illustrated in FIG. 6B, the client application 152 updates the detail product page 611 with the discounted price 621 ($31), as illustrated in FIG. 6C. In the example of FIG. 6C, the updated detail product page 611 also includes the timer 615 encouraging the user to place the product 612 in the shopping cart within the remaining time.

In various implementations, one product is shown at a time with a save-to-see-price offer in a view of a product feed page. In reference to FIG. 6A, since approximately four to six products are shown at a time in a view port of the product feed page 601, one out of every four to six products in the product feed page 601 can be shown with a save-to-see price offer, for example. Within a group of four products, a product with the largest discount (e.g., largest difference between a manufacture suggested retail price and an actual retail price) can be selected to hide its retail price and be shown with a save-to-see-price offer.

User Submitted Rating Photos and Inferred Ratings

Figure 7A:
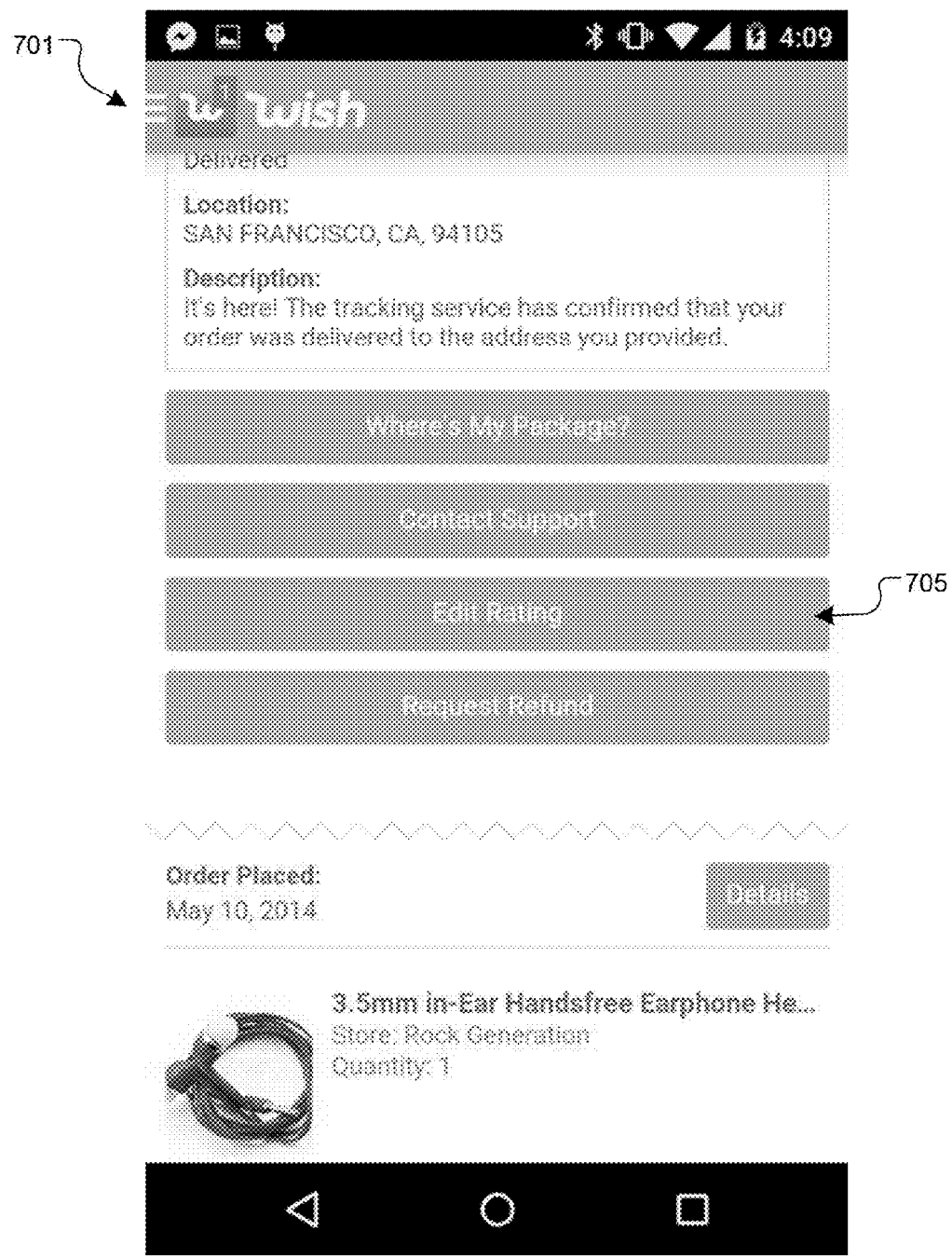
FIGS. 7A, 7B, 7C, and 7D show first, second, third, and fourth user interfaces, respectively, for submitting ratings of an item, according to some embodiments.
Figure 7B:
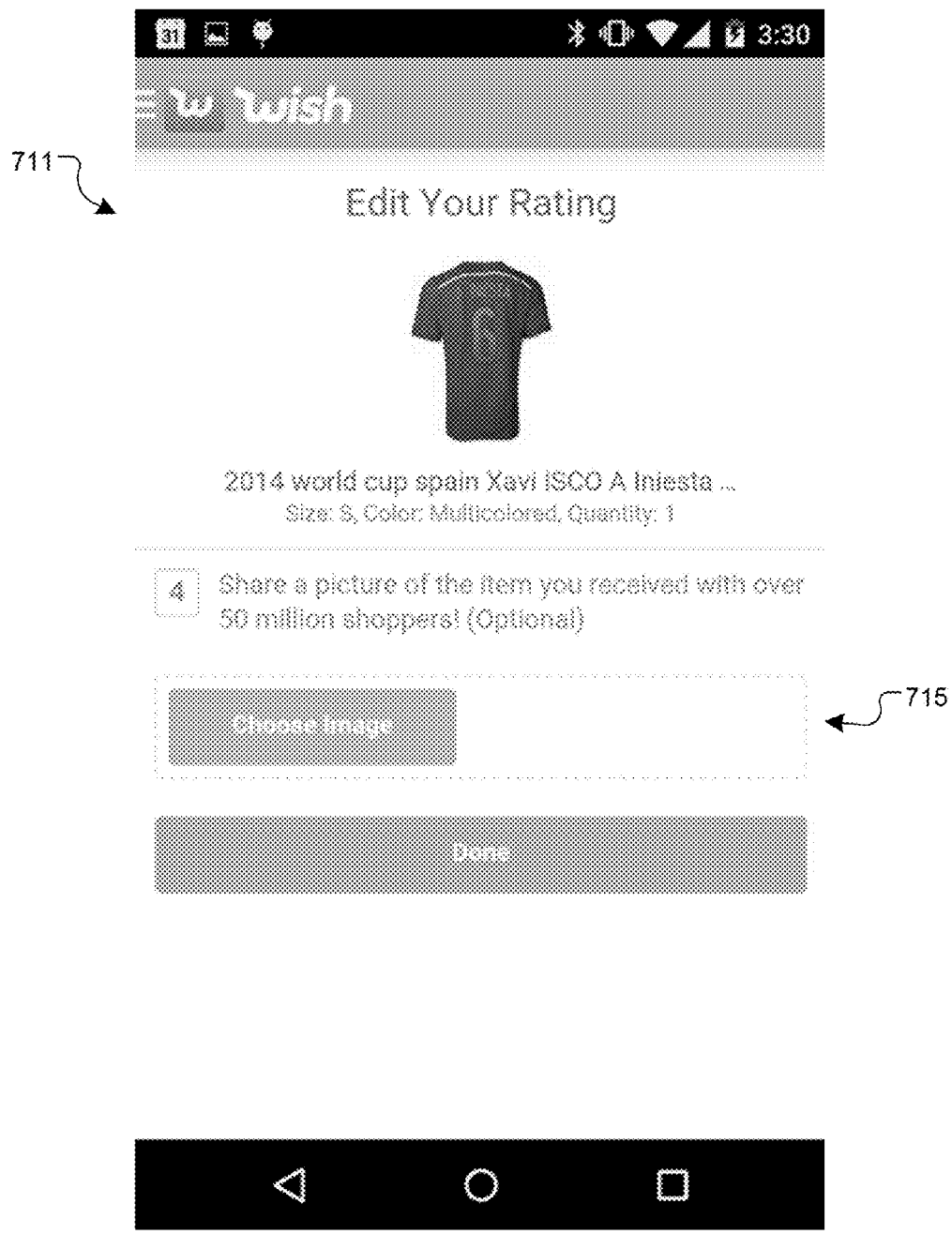

FIGS. 7A-7D illustrate user interfaces through which users can submit or view ratings of items (e.g., products) the users purchased through the online marketplace implemented by the server system 122. In some embodiments, the user interfaces illustrated in FIGS. 7A-7D may be presented to the user as part of method for submitting or viewing ratings of items. FIG. 7A illustrates an example item order history page (e.g., product order history page) 701 presented by the client application 152. In response to user selection of an "Edit Rating" icon 705, the client application 152 presents a rating page 711, as illustrated in FIG. 7B. In the rating page 711, the user has the option (715) to upload a photo of the actual product the user received. For instance, the use can upload a photo of the product (e.g., from the client device 150) through the rating page 711. After receiving an indication from the user about the photo, the client application 152 transmits the photo and information for the user and the purchase (e.g., a particular size of the product the user purchased, an identifier for the purchase record stored in the transaction data database 134, etc.) to the front-end server 112. The front-end server 112 can place the photo provided by the user in the product data database 136. Additionally, the photo can be reviewed (e.g., for picture quality) by a computer or a person. The catalog generator 114 can generate a product detail page for this particular product, and include the user provided photos with other images of the particular product in the product detail page.

Figure 7C:
Figure 7D:

In FIG. 7C, when another user views a detail product page 750 for this particular product, the user can slide left or right on an image 751 of the product to see other images, including user-supplied photos, of the particular product. The user can also select a "see all" icon 752 to see other images of the particular product. FIG. 7D illustrates the detail product page 750 including a user-supplied photo for the particular product. The detail product page 750 can also include information 761 related to the user-supplied photo, for example, the user who supplied the photo, the size of the product for this photo, etc.

Users can also provide ratings in scores such as 1-star, 2-star, 3-star, 4-star, and 5-star. A 5-star rating can be the best rating, while a 1-star rating can be the worst rating. For example, the user can submit a rating (score) of a particular item (e.g., product) through a user interface (e.g., 701) of the client application 152. The client application 152 transmits the user's rating to the front-end server 112, which in turns stores the rating (in reference to the particular product) in the product data database 136. When the catalog generator 114 creates a detail product page for the particular product, the rating module 116 access the product data database 136 for rating data for the particular product and provides the overall rating data (e.g., one 5-star, four 3-star, one two-star, one 1-star) to the catalog generator 114 to be included in the detail product page.

When the number of ratings (scores) submitted by users on a particular product is low (e.g., less than 10), the overall rating data on the particular data can be skewed toward one end of the rating scale (e.g., mostly 1-star scores). To prevent the skewing, the rating module can apply a pre-defined distribution to the overall rating data when the number of ratings submitted is low. The overall rating data is automatically adjusted when more rating scores are submitted and eventually reflects actual overall rating data submitted by users. For instance, the pre-defined distribution can be 20% 5-star, 20% 4-star, 10% 3-star, 20% 2-star, 30% 1-star. The rating module can calculate initial overall rating data assuming a certain number of users (e.g., 100) who may have purchased the particular product but not submitted ratings on the particular product. Thus the overall rating data can be 20 5-star, 20 4-star, 10 3-star, 20 2-star, and 30 1-star. When there are additional scores submitted by users, the rating module adds the submitted scores (counts) to the initial overall rating data for the overall rating data.

In some embodiments, the system 100 may perform a method M1 for reducing or preventing skewing of ratings for an item. In a first step of the method M1, the server system 122 may obtain one or more user-provided ratings for an item. Users may enter the ratings into a user interface 154 of a client application 152 executing on a client device 150. The user interface 154 may include one or more of the user interfaces illustrated in FIGS. 7A-7D, or any other user interface suitable for providing ratings of items (e.g., star-based ratings on a scale of 1-star to 5-stars). The client device 150 may send the user-provided ratings to the server system 122.

In a second step of the method M1, the server system 122 may determine whether the number of user-provided ratings for the item exceeds a threshold number of ratings for the item. The threshold number of ratings may be 5, 10, 20, 50, or any other suitable number of ratings.

In a third step of the method M1, based on a determination that the number of user-provided ratings for the item does not exceed the threshold number of ratings, the server system 122 obtains predicted ratings for the item (e.g., the "initial overall rating data" described above) and provides a set of ratings for the item (e.g., the "overall rating data" described above) to a client device 150 of a user. A client application 152 of the client device 150 may display the set of ratings for the item in a user interface 154. The set of ratings provided to the user may include any user-provided ratings for the item and the predicted ratings for the item.

In some embodiments, the probability distribution of the predicted ratings for the item substantially matches a predicted distribution of ratings for the item. As used herein, two probability distributions "substantially match" if the mean, median, variance, and standard deviation of the first distribution, respectively, are within plus or minus 20% of the mean, median, variance, and standard deviation of the second distribution. In some embodiments, the predicted distribution of ratings for the item may be determined based on the item's category, manufacturer, seller, and/or price. For example, the predicted distribution of ratings for the item may be obtained by combining (e.g., averaging) the actual distributions of ratings for other items in the same category having approximately the same price as the item of interest.

In a fourth step of the method M1, the server system 122 may obtain one or more additional user-provided ratings for the item, and may determine that the total number of user-provided ratings for the item exceeds the threshold number of ratings. Based on this determination, the server system 122 may provide a set of ratings for the item to a client device 150 of a user. The provided set of ratings may include the user-provided ratings for the item, but not the predicted ratings for the item. In other words, when the number of user-provided ratings for an item exceeds the threshold, the server system 122 may discontinue using the predicted ratings for the item.

Signup Flow

Figure 8A:
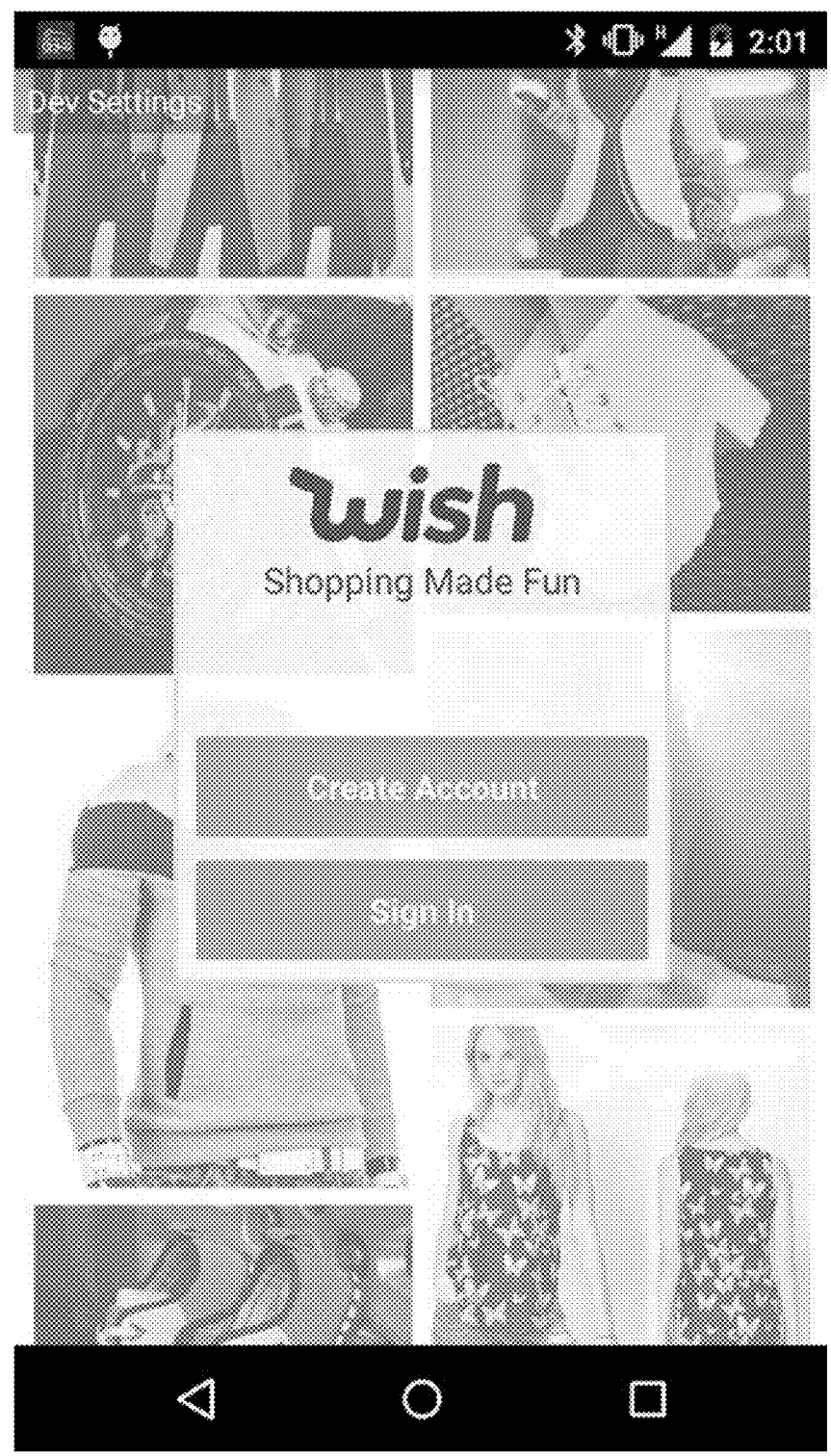
FIGS. 8A, 8B, and 8C show first, second, and third user interfaces, respectively, for registering for an online marketplace, according to some embodiments.
Figure 8B:
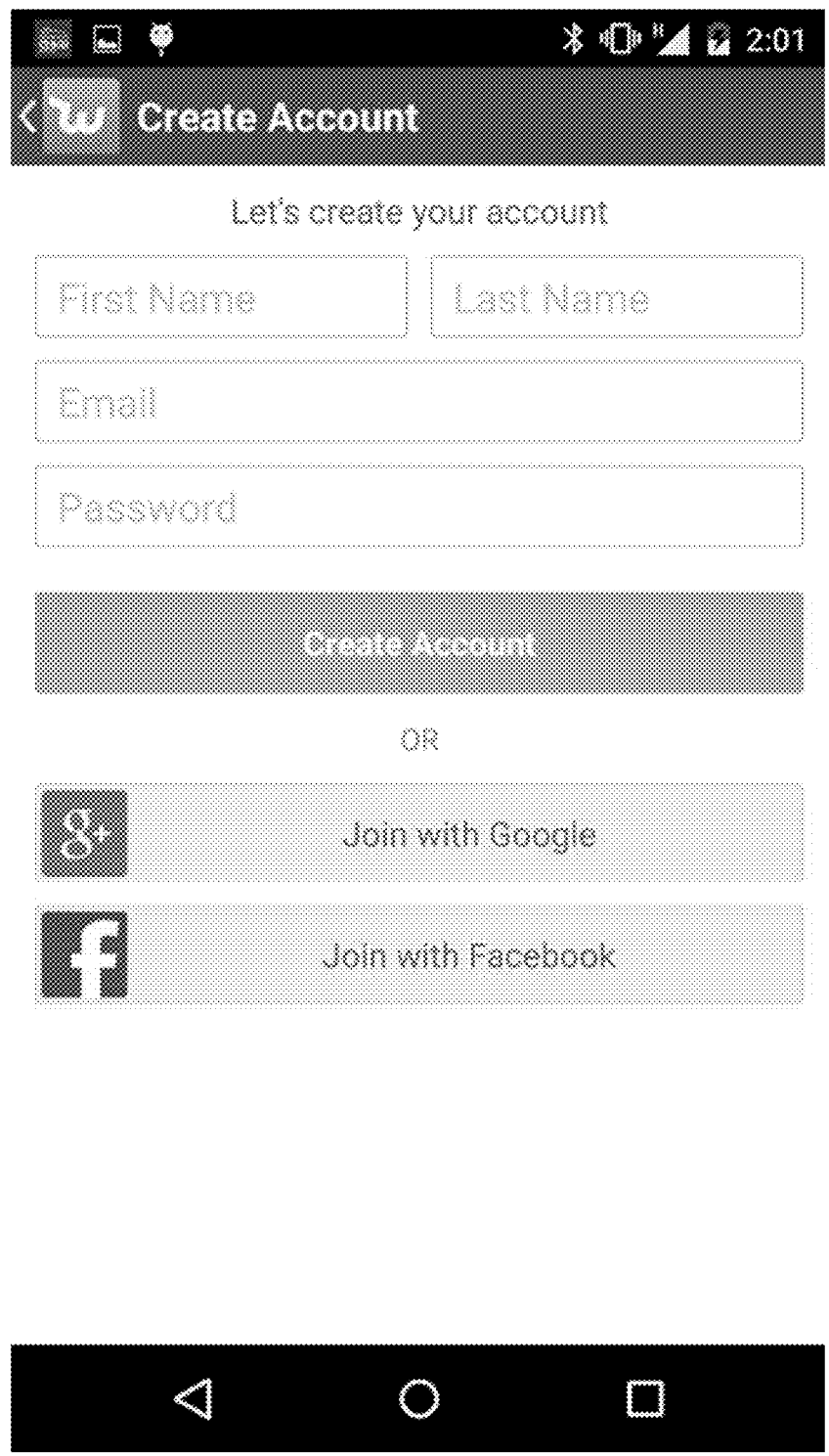
Figure 8C:

FIG. 8A-8C illustrate user interface for registering (e.g., "signing up") for the online marketplace implemented by the server system 122, using the client application 152. In some embodiments, the user interfaces illustrated in FIGS. 8A-8C may be presented to the user as part of method for registering for the online marketplace. FIG. 8A illustrates an example introduction page ("splash page") presented by the client application 152. A user can select "Create Account" to register for the online marketplace. In response to the user's selection, the client application 152 presents a signup form page illustrated in FIG. 8B. The user can provide a name, email address, and password to create an account with the online marketplace. In addition, the user can provide an age, gender, and location to the online marketplace. The client application 152 presents a collections page illustrated in FIG. 8C. The user can select a particular collection from the collection page. The client application 152 transmits to the front-end server 112 the user information provided by the user. The front-end server 112 stores the user information in the user data database 132.

In some implementations, the particular category selected by the user during the signup is initially the first (and only) record in the user's view history. In response to a request from the client application 152 for catalog content and layout—e.g., when the user enters the user interface 201 described in reference to FIG. 2 after selecting the particular category in the collections page of FIG. 8C, the catalog generator 114 can create a layout for the user interface 201 such that the particular collection is placed in front of other collections in the collection panel 220. A category related to the particular collection can also be placed in front of other categories in the category panel 210.

User Similarity and Product Feeds

The catalog generator 114 can create an item feed (e.g., a product feed) (e.g., for a category or collection) based on popularity of products and/or services. For instance, a product with higher sales volume (more popular) can be ranked higher in a product feed than another product with lower sale volume (less popular). Higher ranked products can appear before lower ranked products in a given feed. Products can be ranked by "purchaseability score" (described below), which may be the likelihood that a particular user would purchase the given product. As another example, a product with a higher number of instances of being placed in users' wish lists (more popular) can be ranked higher in a product feed than another product with a lower number of instances being placed in users' wish lists (less popular).

In various implementations, the purchaseability score of a product can be, for example, purchase volume for the product divided by a weighted sum of respective sums of different user actions. User actions can be that a user views the product (e.g., the product's detail product page), a user places the product in wish lists, a user places the product in a shopping cart, and/or a user purchases the product. Other types of user actions are possible.

As another example, the purchaseability score of a product can be a weighted sum of the number of instances of particular user actions for the product, normalized to a number of impressions of the product. The number of impressions can be a number of the products being viewed by users in product feed pages during a specified time period (e.g., past three days). In other implementations, the number of impressions can be a number of the product's detailed product page being viewed by users during a specified time period. In some embodiments, "impressions" of an item include any suitable events or acts whereby information about the item (e.g., an advertisement for the item, an image of the item, a detailed item page for the item, etc.) is presented (e.g., displayed) via a user interface of a client device 150. For purposes of determining the purchaseability score for an item, the number of impressions of the item may be limited to impressions generated during a specified time period.

For instance, the purchaseability score of a product can be as follows:

$$10000 \times \frac{\text{purchases}}{\text{impressions}} \times \sqrt{\text{price}} + 0.1 \times \frac{\text{added to shopping carts}}{\text{impressions}} + 0.001 \times \frac{\text{saved to wish list}}{\text{impressions}},$$

where "purchases" can refer to the number of users who purchased the product or to the total quantity of the product purchased by a specified group of users (e.g., all users), "added to shopping carts" can refer to the number of users who added the product to their shopping carts or to the total quantity of the product added to shopping carts of a specified group of users, and "saved to wish list" can refer to the number of users who added the product to their wish lists or to the total quantity of the product added to wish lists of a specified group of users.

Additionally or in the alternative, a product feed for a particular user can be created based on the particular user's similarity to another group of users. In addition to user segments (e.g., age, gender, location), similarity between users can also be determined by user actions. For instance, similar users can have similar purchase volume during a specified time period (e.g., past week). Similar users can have similar items placed in their respective wish lists. The catalog generator 114 can create a product feed for a particular user by copying or aggregating one or more product feeds of a group of users that have similar age, gender, location, or user actions as the particular user. As another example, weights in the purchaseability score described above can be adjusted based on corresponding weights in the purchaseability score formulas of similar users.

In particular implementations, assume that A is a sparse matrix such that $A_{i,j}=1$ when user i is engaged with product j, and $A_{i,j}=0$ otherwise. A user i may be engaged with a product j if an impression of the product has been presented (e.g., displayed) to the user via the client device 150 (e.g., within a specified time period), if the user has added the product to the user's shopping cart, if the user has added the product to the user's wish list, and/or if the user has purchased the product. The similarity score between users u and v can be:

$$S_{u,v} = \frac{\sum_j A_{u,j} \times A_{v,j}}{\sqrt{\sum_j A_{u,j}^2} \times \sqrt{\sum_j A_{v,j}^2}}$$

For a given user u, the catalog generator 114 can find top similar users (e.g., top 10,000 similar users) by respective similarity scores. The catalog generator 114 can calculate a similarity weighted interested score for a given product with respect to the top similar users:

$$\sum_k SW_{u,k}$$

In the above equation, $SW_{u,k}=S_{u,k}$ if a top similar user k purchased the given product, and $SW_{u,k}=0$ otherwise. The catalog generator 114 can determine a set (e.g., 1,000) of top ranked products according to the above equation, and recommend the set of top ranked products to user u.

The catalog generator 114 can create, for a particular user, a first set of items (e.g., products) based on purchaseability and a second set of items (e.g., products) based on similarity scores as described above. The catalog generator 114 can generate a product feed for the particular user by interleaving the first and second sets of products. For instance, when the product feed is displayed to the particular user for the first time, products from the first set can have 70% opportunity of being displayed in a given placement of the product feed, until the first set is exhausted and all products from the second set are then displayed. When the product feed is displayed to the particular user for the second time (e.g., due to a refresh by the particular user), products from the first set can have 50% opportunity of being displayed in a given placement of the product feed. The ratio can be reduced to 30% for the third time the product feed is displayed to the particular user and 10% for the fourth time the product feed is displayed to the particular user. Subsequently, products from the first set can be placed randomly between products from the second set in the product feed.

When the user requests or refreshes an item feed (e.g., a product feed), the catalog generator 114 or the client application 152 can rearrange (shuffle) the order of products in the product feed. In this way, the user can see something new every time the user loads or refresh the product feed. In various implementations, the order of the products in the product feed can be rearranged by a weighted random shuffling or ordering, for example:

$$\frac{\log(\text{random}(0, 1))}{\text{purchaseability score}}.$$

In some embodiments, the system 100 may perform a method M2 for determining the order of items in an item feed. In a first step of the method M2, the server system 122 may receive data indicative of selection of a type of item (e.g., a category of items and/or a collection of items). The selection data may be received, for example, from a client device 150 of a user. For example, a user may select a category via the category panel 210 of the user interface shown in FIG. 2, or via any other suitable user interface. As another example, a user may select a collection via the collection panel 220 of the user interface shown in FIG. 2, or via any other suitable user interface. The client device 150 may then send data indicative of the selected item type to the server system 122.

In a second step of the method M2, the server system 122 may determine purchaseability scores for a set of items of the specified type (e.g., for a set of items in the specified category or collection). The server system 122 may determine an item's purchaseability score based, at least in part, on (1) the number of impressions of the item provided to a specified group of users (e.g., all users) during a specified time period, (2) the quantity of the item purchased by the specified group of users, and (3) the quantity of the item added to shopping carts of the specified group of users. In some embodiments, the server system's determination of the purchaseability score for an item is also based on the purchase price of the item and/or on the total quantity of the item added to the wish lists of the specified group of users. In some embodiments, the server system 122 determines the purchaseability score for an item based, at least in part, on the expression:

$$W_1 \times \frac{quant\_purchases}{impressions} \times \sqrt{price} +$$
$$W_2 \times \frac{quant\_cart}{impressions} + W_3 \times \frac{quant\_wish\_list}{impressions}$$

wherein $W_1$, $W_2$, and $W_3$ are first, second, and third weights, respectively, wherein 'impressions' is the number of impressions of the respective item provided to a specified group of users during a specified time period (or the number of users to whom impressions of the item were presented during the time period), wherein 'quant_purchases' is the quantity of the item purchased by the specified group of users (or the number of users in the group who purchased the item), wherein 'quant_cart' is the quantity of the item added to shopping carts of the specified group of users (or the number of users in the group who added at least one of the item to their shopping carts), wherein 'quant_wish_list' is the quantity of the item added to wish lists of the specified group of users (or the number of users who added at least one of the item to their wish lists), and wherein 'price' is a purchase price of the item (e.g., an average purchase price of the item). The specified group of users may be selected by the server system 122 based, at least in part, on similarities between the group of users and the user for whom the purchaseability scores are being calculated.

In a third step of the method M2, the server system 122 may determine a ranking of the set of items of the specified type based, at least in part, on the purchaseability scores of the respective items included in the plurality of items. The ranking can be, for example, a total ranking or a partial ranking.

In a fourth step of the method M2, the server system 122 may determine a ranking of a second set of items. The second set of items may include items contained in the item feeds of a group of users who are similar to the user for whom the items are being ranked. In some embodiments, the server system ranks the second set of items for the user based, at least in part, on the similarities between the user and the group of users whose item feeds provided the items. In some embodiments, the similarities between the user and the group of users may be determined using the formula provided above. In some embodiments, the similarities between users may include similarities in demographics (e.g., the above-described "user segments"). In some embodiments, the similarities between users may include similarities in shopping activity (e.g., viewing certain items, adding certain items to a shopping cart and/or wish list, purchasing certain items, etc.).

In some embodiments, the second set of items may consist entirely of items not contained in the first set of items. In some embodiments, the second set of items and the first set of items may partially overlap (e.g., one or more items may be contained in both sets of items). In embodiments where the sets of items overlap, any item that is contained in both sets may be removed from either of the sets, to avoid duplication of items in the item feed.

In a fifth step of the method M2, the server system 122 may use the first set of items (and, optionally, the second set of items) to populate the item feed for the type of item selected by the user. If the item feed contains only items from the first set of items, the ordering of items in the item feed may match the ranking of the items in the first set of items. If the item feed contains items from the first and second sets of items, the ordering of items in the item feed may depend on the rankings of the first and second sets of items.

The server system 122 may merge the first and second sets of items into an ordered item feed using any suitable technique. In some embodiments, first and second sets of items may be merged into the ordered item feed without disturbing the relative ranking among the items included in the first set of items, and without disturbing the relative ranking among the items included in the second set of items. Thus, the partial ordering within the item feed of items contained in the first set of items may match the ranking of the same items within the first set, and the partial ordering within the item feed of items contained in the second set of items may match the ranking of the same items within the second set. In some embodiments, the server system 122 may probabilistically determine the relative ordering within the item feed between items from the first set and items from the second set.

In some embodiments, the server system 122 determines the ordering of the items in the item feed by: (a) probabilistically selecting between the first set of items and the second set of items, wherein a first probability of selecting the first set of items is $P_1$ and a second probability of selecting the second set of items is $1-P_1$; (b) from the selected set of items, identifying the highest-ranked item that has not yet been assigned a position in the ordering of item feed, (c) assigning the identified item to the next position in the ordering of the item feed; and (d) repeating steps (a)-(c) until a specified number of items have been assigned positions in the ordering of the item feed or until all the items in the first and second sets of items have been assigned positions in the ordering of the item feed. As described above, the server system may change the first and second probabilities in response to passage of a specified period of time and/or in response to a request to change the ordering of the set of items. As further described above, the server system 122 may change the ranking of the items in the first set of items by performing a weighted random shuffling of the purchaseability scores of those items.

In a sixth step of the method M2, the server system 122 may provide the item feed data to a client device 150 of the user. The client device 150 may be configured to display a scrollable feed of item panels (e.g., frames) corresponding to the items identified in the item feed data. The item panels in the scrollable feed may be ordered according to the ordering of the corresponding items in the item feed data.

New Products

For a new product added to the online marketplace implemented by the server system 122, the catalog generator 114 can insert the new product in an existing product feed for users to "explore." The catalog generator 114 first assigns user segments for the new products based on contextual information from the new product's description. For instance, the catalog generator 114 can assign the new product to a female user segment if the product's description includes the phrase "hand bag" or another phrase generally associated with items that are generally of greater interest to women than to men. The catalog generator 114 can assign the new product to a male user segment if the product's description includes the phrase "oxford dress shoes" or another phrase generally associated with items that are generally of greater interest to men than to women. The catalog generator 114 can assign the new product to age segments younger than 41 years old if the product's description includes "video game" or another phrase generally associated with items that are generally of greater interest to persons younger than 41 years old than to persons 41 years old or older. The catalog generator 114 then inserts the new product into one or more product feeds related to the assigned user segments. As users views the new products and perform various user actions (e.g., viewing, placing in a wish list, placing in a shopping cart, purchasing), the catalog generator 114 can place the new product in different product feeds based on user actions as described earlier.

For a given item (e.g., product), the catalog generator 114 can maintain an engagement score (e.g., a ratio of a number of user actions to a number of impressions for the product). When a number impressions of a new product exceeds a specified threshold (e.g., 10,000), the catalog generator 114 compares the new product's engagement score to engagement scores of other existing products in a user segment (e.g., a male user segment). If the new product's engagement score is comparable to or higher than engagement scores of the other existing products in the user segment (e.g., the new product's engagement score is equal to or higher than a median engagement score of the other products), the new product can be kept for exploration by users. Otherwise the new product can be considered not interesting to users and the catalog generator 114 can stop showing the new product in product feeds. A new product (e.g., a high-quality new product) can eventually be included in product feed recommendation based on similarity or purchase-ability scores as described earlier.

Further Description of Some Embodiments

Although user-provided ratings of items in an online marketplace can assist consumers in assessing other consumers' opinions of an item before purchasing the item, user-provided ratings can be misleading. Consumers who make purchasing decisions based on misleading ratings data can make sub-optimal purchasing decisions, to their own detriment. For example, the number of user-provided ratings for some items (e.g., items offered for sale only recently) can be very low, and the distribution of the ratings for such items may not be representative of the actual distribution of opinions of consumers who are familiar with the item. Thus, there is a need for ratings systems and techniques that more accurately represent the actual distribution of opinions of consumers who are familiar with an item, even when the number of user-provided ratings for the item is low. The inventors have recognized and appreciated that the accuracy of the distribution of ratings for an item with a low number of user-provided ratings can be enhanced by supplementing the user-provided ratings with one or more predicted ratings. For many items, the actual distribution of item ratings can be accurately predicted (e.g., based on the item's type, price, manufacturer, etc.). As the number of user-provided ratings for an item increases, the number of predicted ratings can be reduced, until only user-provided ratings for the item are displayed.

According to another aspect of the present disclosure, a computer-implemented method is provided, including: obtaining one or more user-provided ratings for an item, wherein the one or more user-provided ratings are provided by users of a computer system; determining whether the number of user-provided ratings for the item exceeds a threshold number of ratings for the item; and based on a determination that the number of user-provided ratings for the item does not exceed the threshold number of ratings: obtaining a plurality of predicted ratings for the item, and providing a set of ratings for the item to a device of a user, wherein the set of ratings for the item includes the one or more user-provided ratings and the plurality of predicted ratings.

In some embodiments, a distribution of the predicted ratings for the item substantially matches a predicted distribution of ratings for the item. In some embodiments, the method further includes determining the predicted distribution of ratings for the item based, at least in part, on a categorization of the item, a manufacturer of the item, a seller of the item, and/or a price of the item. In some embodiments, the method further includes determining the predicted distribution of ratings for the item based, at least in part, on actual distributions of ratings for one or more other items. In some embodiments, the item and the one or more other items are in the same category (or collection) of items, are manufactured by the same manufacturer, are sold by the same seller, and/or have prices in the same range of prices.

In some embodiments, the one or more user-provided ratings are one or more first user-provided ratings, and the method further includes: obtaining one or more second user-provider ratings for the item; determining whether a combined number of the first and second user-provided ratings for the item exceeds the threshold number of ratings for the item; and based on a determination that the combined number of user-provided ratings for the item exceeds the threshold number of ratings: providing a set of ratings for the item to a device of a user, wherein the set of ratings for the item consists of the one or more first user-provided ratings and the one or more second user-provided ratings.

According to another aspect of the present disclosure, a system is provided, including one or more computers programmed to perform operations including: obtaining one or more user-provided ratings for an item, wherein the one or more user-provided ratings are provided by users of a computer system; determining whether the number of user-provided ratings for the item exceeds a threshold number of ratings for the item; and based on a determination that the number of user-provided ratings for the item does not exceed the threshold number of ratings: obtaining a plurality of predicted ratings for the item, and providing a set of ratings for the item to a device of a user, wherein the set of ratings for the item includes the one or more user-provided ratings and the plurality of predicted ratings.

In some embodiments, a distribution of the predicted ratings for the item substantially matches a predicted distribution of ratings for the item. In some embodiments, the operations further include determining the predicted distribution of ratings for the item based, at least in part, on a categorization of the item, a manufacturer of the item, a seller of the item, and/or a price of the item. In some embodiments, the operations further include determining the predicted distribution of ratings for the item based, at least in part, on actual distributions of ratings for one or more other items. In some embodiments, the item and the one or more other items are in the same category (or collection) of items, are manufactured by the same manufacturer, are sold by the same seller, and/or have prices in the same range of prices.

In some embodiments, the one or more user-provided ratings are one or more first user-provided ratings, and the operations further include: obtaining one or more second user-provider ratings for the item; determining whether a combined number of the first and second user-provided ratings for the item exceeds the threshold number of ratings for the item; and based on a determination that the combined number of user-provided ratings for the item exceeds the threshold number of ratings: providing a set of ratings for the item to a device of a user, wherein the set of ratings for the item consists of the one or more first user-provided ratings and the one or more second user-provided ratings.

According to another aspect of the present disclosure, a computer storage medium is provided, the computer storage medium having instructions stored thereon that, when executed by a data processing apparatus, cause the data processing apparatus to perform operations including: obtaining one or more user-provided ratings for an item, wherein the one or more user-provided ratings are provided by users of a computer system; determining whether the number of user-provided ratings for the item exceeds a threshold number of ratings for the item; and based on a determination that the number of user-provided ratings for the item does not exceed the threshold number of ratings: obtaining a plurality of predicted ratings for the item, and providing a set of ratings for the item to a device of a user, wherein the set of ratings for the item includes the one or more user-provided ratings and the plurality of predicted ratings.

In some embodiments, a distribution of the predicted ratings for the item substantially matches a predicted distribution of ratings for the item. In some embodiments, the operations further include determining the predicted distribution of ratings for the item based, at least in part, on a categorization of the item, a manufacturer of the item, a seller of the item, and/or a price of the item. In some embodiments, the operations further include determining the predicted distribution of ratings for the item based, at least in part, on actual distributions of ratings for one or more other items. In some embodiments, the item and the one or more other items are in the same category (or collection) of items, are manufactured by the same manufacturer, are sold by the same seller, and/or have prices in the same range of prices.

In some embodiments, the one or more user-provided ratings are one or more first user-provided ratings, and the operations further include: obtaining one or more second user-provider ratings for the item; determining whether a combined number of the first and second user-provided ratings for the item exceeds the threshold number of ratings for the item; and based on a determination that the combined number of user-provided ratings for the item exceeds the threshold number of ratings: providing a set of ratings for the item to a device of a user, wherein the set of ratings for the item consists of the one or more first user-provided ratings and the one or more second user-provided ratings.

Representative Implementations

Implementations of the subject matter and the operations described in this specification (including, but not limited to, the methods M1 and M2, and the operations performed by the client device 150, server system 122, front-end server 112, catalog generator 114, and/or rating module 116) can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A computer-implemented method comprising:
receiving, from a mobile device of a user, data indicative of selection of a type of item;
determining a ranking of a plurality of items of the type, including:
for each item included in the plurality of items of the type, quantitatively determining, with a processor, a purchaseability score for the respective item based, at least in part, on (1) a number of impressions of the respective item provided to a plurality of users during a time period, (2) a quantity of the respective item purchased by the plurality of users, and (3) a ratio between a quantity of the respective item added to shopping carts of the plurality of users and the number of impressions of the respective item provided to the plurality of users during the time period, wherein adding the respective item to a shopping cart comprises creating a record of a potential transaction and storing the record in a transaction database; and
determining, with a processor, a ranking of the items included in the plurality of items based, at least in part, on the purchaseability scores of the respective items included in the plurality of items;
generating, with a processor, item feed data indicating a particularized rank ordering of a set of items including the plurality of items, wherein the ordering of the items included in the set of items is determined based, at least in part, on the ranking of the items included in the plurality of items; and managing presentation of the item feed data, based on the ordering of the set of items, to conserve computer system resources, including:

sending, with a processor and via a communication network, a first portion of the item feed data to the mobile device of the user, wherein the first portion of the item feed data corresponds to a first subset of the set of items;

generating, with a processor, a hybrid user interface comprising a category panel, a collection panel, and a product panel including at least one frame, wherein selection of the frame results in presentation of another user interface displaying information of a corresponding item;

displaying, by the mobile device of the user, a scrollable feed of item panels corresponding to the items included in the first subset of items, wherein the item panels in the scrollable feed are ordered according to the ordering of the corresponding items in the first portion of the item feed data;

sending, from the mobile device of the user, a request to complete a purchase of at least one of the items included in the first subset of items; and in response to receiving the request to complete the purchase, storing a transaction record for the purchase in the transaction database, thereby processing the request, wherein a second portion of the item feed data corresponding to a second, non-empty subset of the set of items is not presented to the user of the mobile device, and wherein the first subset of items precede the second subset of items in the ordering of the items indicated by the item feed data.

2. The method of claim 1, wherein the purchaseability score for the respective item is further based, at least in part, on a purchase price of the item.

3. The method of claim 2, wherein the purchaseability score for the respective item is further based, at least in part, on a quantity of the respective item added to wish lists of the plurality of users.

4. The method of claim 3, wherein the quantitatively determined purchaseability score for the respective item is based, at least in part, on the expression:

$$W_1 \times \frac{quant\_purchases}{impressions} \times \sqrt{price} + W_2 \times \frac{quant\_cart}{impressions} + W_3 \times \frac{quant\_wish\_list}{impressions}$$

wherein $W_1$, $W_2$, and $W_3$ are first, second, and third weights, respectively, wherein 'impressions' is the number of impressions of the respective item provided to the plurality of users during the time period, wherein 'quant_purchases' is the quantity of the item purchased by the plurality of users, wherein 'quant_cart' is the quantity of the item added to the shopping carts of the plurality of users, wherein 'quant_wish_list' is the quantity of the item added to wish lists of the plurality of users, and wherein 'price' is a purchase price of the item.

5. The method of claim 1, further comprising selecting users for inclusion in the plurality of users based, at least in part, on one or more similarities between the user and the users.

6. The method of claim 5, wherein the item feed data further indicate a combined source of the set of items, wherein the plurality of items is a first plurality of items, wherein generating the item feed data comprises determining a ranking of a second plurality of items based, at least in part, on (1) the one or more similarities between the user and the users, and (2) data indicating whether the users purchased the respective items included in the plurality of items, and wherein the set of items further includes the second plurality of items.

7. The method of claim 6, wherein the ordering of the set of items is further determined based, at least in part, on the ranking of the second plurality of items.

8. The method of claim 7, wherein an ordering among the first plurality of items within the set of items matches an ordering among the first plurality of items within the ranking of the first plurality of items, wherein an ordering among the second plurality of items within the set of items matches an ordering among the second plurality of items within the ranking of the second plurality of items, and wherein an ordering within the set of items between items included in the first plurality of items and items included in the second plurality of items is determined probabilistically.

9. The method of claim 8, wherein generating the item feed data further comprises determining the ordering of the set of items, including:

(a) probabilistically selecting between the first plurality of items and the second plurality of items, wherein a first probability of selecting the first plurality of items is $P_1$ and a second probability of selecting the second plurality of items is $1-P_1$;

(b) from the selected plurality of items, identifying a highest-ranked item that has not yet been assigned a position in the ordering of the set of items, and assigning the identified item to a next position in the ordering of the set of items; and repeating steps (a) and (b) until a specified number of items have been assigned positions in the ordering of the set of items or until all the items in the first and second pluralities of items have been assigned positions in the ordering of the set of items.

10. The method of claim 9, further comprising changing the first and second probabilities in response to passage of a specified period of time and/or in response to a request to change the ordering of the set of items.

11. The method of claim 1, wherein generating the item feed data comprises changing the rankings of the items included in the plurality of items by performing a weighted random shuffling of the purchaseability scores of the items included in the plurality of items.

12. A system comprising:

one or more computers programmed to perform operations comprising:

receiving, from a mobile device of a user, data indicative of selection of a type of item;

determining a ranking of a plurality of items of the type, including:

for each item included in the plurality of items of the type, quantitatively determining, with a processor, a purchaseability score for the respective item based, at least in part, on (1) a number of impressions of the respective item provided to a plurality of users during a time period, (2) a quantity of the respective item purchased by the plurality of users, and (3) a ratio between a quantity of the respective item added to shopping carts of the plurality of users and the number of impressions of the respective item provided to the plurality of users during the time period, wherein adding the respective item to a shopping cart comprises creating a record of a potential transaction and storing the record in a transaction database; and determining, with a processor, a ranking of the items included in the plurality of items based, at least in part, on the purchaseability scores of the respective items included in the plurality of items;

generating, with a processor, item feed data indicating a particularized rank ordering of a set of items including the plurality of items, wherein the ordering of the items included in the set of items is determined based, at least in part, on the ranking of the items included in the plurality of items; and managing presentation of the item feed data, based on the ordering of the set of items, to conserve resources of the system, including:

sending, with a processor and via a communication network, a first portion of the item feed data to the mobile device of the user, wherein the first portion of the item feed data corresponds to a first subset of the set of items;

generating, with a processor, a hybrid user interface comprising a category panel, a collection panel, and a product panel including at least one frame, wherein selection of the frame results in presentation of another user interface displaying information of a corresponding item;

displaying, by the mobile device of the user, a scrollable feed of item panels corresponding to the items included in the first subset of items, wherein the item panels in the scrollable feed are ordered according to the ordering of the corresponding items in the first portion of the item feed data;

sending, from the mobile device of the user, a request to complete a purchase of at least one of the items included in the first subset of items; and in response to receiving the request to complete the purchase, storing a transaction record for the purchase in the transaction database, thereby processing the request, wherein a second portion of the item feed data corresponding to a second, non-empty subset of the set of items is not presented to the user of the mobile device, and wherein the first subset of items precede the second subset of items in the ordering of the items indicated by the item feed data.

13. The system of claim 12, wherein the purchaseability score for the respective item is further based, at least in part, on a purchase price of the item.

14. The system of claim 13, wherein the purchaseability score for the respective item is further based, at least in part, on a quantity of the respective item added to wish lists of the plurality of users.

15. The system of claim 14, wherein the quantitatively determined purchaseability score for the respective item is based, at least in part, on the expression:

$$W_1 \times \frac{quant\_purchases}{impressions} \times \sqrt{price} +$$
$$W_2 \times \frac{quant\_cart}{impressions} + W_3 \times \frac{quant\_wish\_list}{impressions}$$

wherein $W_1$, $W_2$, and $W_3$ are first, second, and third weights, respectively, wherein 'impressions' is the number of impressions of the respective item provided to the plurality of users during the time period, wherein 'quant_purchases' is the quantity of the item purchased by the plurality of users, wherein 'quant_cart' is the quantity of the item added to the shopping carts of the plurality of users, wherein 'quant_wish_list' is the quantity of the item added to wish lists of the plurality of users, and wherein 'price' is a purchase price of the item.

16. The system of claim 12, wherein the operations further comprise selecting users for inclusion in the plurality of users based, at least in part, on one or more similarities between the user and the users.

17. The system of claim 16, wherein the plurality of items is a first plurality of items, wherein the item feed data further indicate the combined source of the set of items, wherein generating the item feed data comprises determining a ranking of a second plurality of items based, at least in part, on (1) the one or more similarities between the user and the users, and (2) data indicating whether the users purchased the respective items included in the plurality of items, and wherein the set of items further includes the second plurality of items.

18. The system of claim 17, wherein the ordering of the set of items is further determined based, at least in part, on the ranking of the second plurality of items.

19. The system of claim 18, wherein an ordering among the first plurality of items within the set of items matches an ordering among the first plurality of items within the ranking of the first plurality of items, wherein an ordering among the second plurality of items within the set of items matches an ordering among the second plurality of items within the ranking of the second plurality of items, and wherein an ordering within the set of items between items included in the first plurality of items and items included in the second plurality of items is determined probabilistically.

20. The system of claim 19, wherein generating the item feed data further comprises determining the ordering of the set of items, including:

(a) probabilistically selecting between the first plurality of items and the second plurality of items, wherein a first probability of selecting the first plurality of items is $P_1$ and a second probability of selecting the second plurality of items is $1-P_1$;

(b) from the selected plurality of items, identifying a highest-ranked item that has not yet been assigned a position in the ordering of the set of items, and assigning the identified item to a next position in the ordering of the set of items; and repeating steps (a) and (b) until a specified number of items have been assigned positions in the ordering of the set of items or until all the items in the first and second pluralities of items have been assigned positions in the ordering of the set of items.

21. The system of claim 20, wherein the operations further comprise changing the first and second probabilities in response to passage of a specified period of time and/or in response to a request to change the ordering of the set of items.

22. The system of claim 12, wherein generating the item feed data comprises changing the rankings of the items included in the plurality of items by performing a weighted random shuffling of the purchaseability scores of the items included in the plurality of items.

23. A computer storage medium having instructions stored thereon that, when executed by a data processing apparatus, cause the data processing apparatus to perform operations comprising:

receiving, from a mobile device of a user, data indicative of selection of a type of item;

determining a ranking of a plurality of items of the type, including:

for each item included in the plurality of items of the type, quantitatively determining, with a processor, a purchaseability score for the respective item based, at least in part, on (1) a number of impressions of the respective item provided to a plurality of users during a time period, (2) a quantity of the respective item purchased by the plurality of users, and (3) a ratio between a quantity of the respective item added to shopping carts of the plurality of users and the number of impressions of the respective item provided to the plurality of users during the time period, wherein adding the respective item to a shopping cart comprises creating a record of a potential transaction and storing the record in a transaction database; and determining, with a processor, a ranking of the items included in the plurality of items based, at least in part, on the purchaseability scores of the respective items included in the plurality of items;

generating, with a processor, item feed data indicating a particularized rank ordering of a set of items including the plurality of items, wherein the ordering of the items included in the set of items is determined based, at least in part, on the ranking of the items included in the plurality of items; and managing presentation of the item feed data, based on the ordering of the set of items, to conserve computer system resources, including:

sending, with a processor and via a communication network, a first portion of the item feed data to the mobile device of the user, wherein the first portion of the item feed data corresponds to a first subset of the set of items;

generating, with a processor, a hybrid user interface comprising a category panel, a collection panel, and a product panel including at least one frame, wherein selection of the frame results in presentation of another user interface displaying information of a corresponding item;

displaying, by the mobile device of the user, a scrollable feed of item panels corresponding to the items included in the first subset of items, wherein the item panels in the scrollable feed are ordered according to the ordering of the corresponding items in the first portion of the item feed data;

sending, from the mobile device of the user, a request to complete a purchase of at least one of the items included in the first subset of items; and in response to receiving the request to complete the purchase, storing a transaction record for the purchase in the transaction database, thereby processing the request, wherein a second portion of the item feed data corresponding to a second, non-empty subset of the set of items is not presented to the user of the mobile device, and wherein the first subset of items precede the second subset of items in the ordering of the items indicated by the item feed data.

* * * * *